US012736610B2

(12) United States Patent
Nam et al.

(10) Patent No.: US 12,736,610 B2
(45) Date of Patent: Sep. 15, 2026

(54) NON-UNIFORM REFERENCE SIGNAL PATTERNS FOR POSITIONING AND SENSING

(71) Applicant: QUALCOMM Incorporated, San Diego, CA (US)

(72) Inventors: Wooseok Nam, San Diego, CA (US); Sony Akkarakaran, Poway, CA (US); Yucheng Dai, San Diego, CA (US); Jingchao Bao, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 670 days.

(21) Appl. No.: 18/169,035

(22) Filed: Feb. 14, 2023

(65) Prior Publication Data

US 2024/0272268 A1 Aug. 15, 2024

(51) Int. Cl.

*G01S 7/00* (2006.01)
*G01S 13/00* (2006.01)
*H04L 27/26* (2006.01)

(52) U.S. Cl.

CPC ............ *G01S 7/006* (2013.01); *G01S 13/003* (2013.01); *H04L 27/2613* (2013.01)

(58) Field of Classification Search

CPC ..... G01S 7/006; G01S 13/003; H04L 27/2613
See application file for complete search history.

(56) References Cited

U.S. PATENT DOCUMENTS

| | | | | |
|---|---|---|---|---|
| 11,777,764 B2* | 10/2023 | Sun | H04L 25/0226 370/430 |
| 2013/0315168 A1* | 11/2013 | Frank | G01S 5/0205 370/329 |
| 2020/0191943 A1* | 6/2020 | Wu | G01S 13/726 |
| 2020/0313932 A1* | 10/2020 | Sun | H04L 25/0226 |
| 2022/0006589 A1* | 1/2022 | Dwivedi | G01S 1/0428 |
| 2022/0045811 A1* | 2/2022 | Lin | G01S 5/0236 |

FOREIGN PATENT DOCUMENTS

WO 2021191845 A1 9/2021

OTHER PUBLICATIONS

International Search Report and Written Opinion—PCT/US2023/086157—ISA/EPO—May 8, 2024.

(Continued)

*Primary Examiner* — Marcus E Windrich
(74) *Attorney, Agent, or Firm* — Thien T. Nguyen

(57) ABSTRACT

An example method of positioning, sensing, or both performed by a receiving device, the method may comprise receiving a non-uniform reference signal configuration for positioning, sensing, or both; receiving a reference signal configured in accordance with the non-uniform reference signal configuration, wherein the reference signal comprises a plurality of subcarriers, and wherein a frequency spacing between different pairs of neighboring subcarriers of the reference signal comprises a plurality of different values; and determining one or more time of arrival (TOA) measurements used for positioning, sensing, or both based on the received reference signal.

32 Claims, 12 Drawing Sheets

(56) References Cited

OTHER PUBLICATIONS

Moderator (Qualcomm): "Moderator Summary #2 for [109-e-R18-Pos-04] Email Discussion on Potential Solutions For SL Positioning", 3GPP TSG RAN WG1 #109-e, R1-2205457, 3rd Generation Partnership Project, Mobile Competence Centre 650, Route Des Lucioles, F-06921 Sophia-Antipolis Cedex, France, vol. RAN WG1, No. e-Meeting, May 9, 2022-May 20, 2022, May 20, 2022, 153 Pages, XP052204269, pp. 1, 47-56 section 4.2.3 SL-PRS Frequency domain Pattern.

* cited by examiner

Radio Frame t-1
Radio Frame t-1
Radio Frame T+1
10 ms
Subframe 0
Subframe 1
Subframe 2
Subframe 3
Subframe 4
Subframe 5
Subframe 6
Subframe 7
Subframe 8
Subframe 9
1 ms
Slot 0
Slot 1
Slot 2
Slot 3
0 1 2 3 4 5 6 7 8 9 10 11 12 13
Symbols
SS Block
Resource Block (RB)
Carrier
Subcarrier
Symbol
Resource Element (RE)

NON-UNIFORM REFERENCE SIGNAL PATTERNS FOR POSITIONING AND SENSING

BACKGROUND

1. Field of Disclosure

The present disclosure relates generally to the field of radio frequency (RF)-based sensing, or simply "RF sensing" in a wireless network such as a cellular network.

2. Description of Related Art

The sensing of objects and positioning of devices can have a wide range of consumer, industrial, commercial, military, and other applications. The position of an object or device can be estimated based on information gathered using different sensing and/or positioning technologies. For example, cellular networks such as fifth-generation (5G) new radio (NR) cellular networks can be used to determine the position of wireless devices, such as user equipments (UEs) and are expanding into RF sensing to be able to detect objects (including their location and speed) from reflections (or echoes) of RF signals reflecting from the objects.

BRIEF SUMMARY

An example method of positioning, sensing, or both performed by a receiving device, the method may comprise receiving a non-uniform reference signal configuration for positioning, sensing, or both; receiving a reference signal configured in accordance with the non-uniform reference signal configuration, wherein the reference signal comprises a plurality of subcarriers, and wherein a frequency spacing between different pairs of neighboring subcarriers of the reference signal comprises a plurality of different values; and determining one or more time of arrival (TOA) measurements used for positioning, sensing, or both based on the received reference signal.

An example method of positioning, sensing, or both performed by a server, the method may comprise: determining a non-uniform reference signal configuration for a reference signal of positioning, sensing, or both, wherein the reference signal comprises a plurality of subcarriers, and wherein according to the non-uniform reference signal configuration, the reference signal is configured such that a frequency spacing between different pairs of neighboring subcarriers of the reference signal comprises a plurality of different values; and transmitting the non-uniform reference signal configuration for determining one or more time of arrival (TOA) measurements based on the reference signal.

An example device for positioning, sensing, or both performed, the device may comprise: a transceiver; a memory; and one or more processors communicatively coupled with the transceiver and the memory. The one or more processors may be configured to: receive a non-uniform reference signal configuration for positioning, sensing, or both; receive a reference signal configured in accordance with the non-uniform reference signal configuration, wherein the reference signal comprises a plurality of subcarriers, and wherein a frequency spacing between different pairs of neighboring subcarriers of the reference signal comprises a plurality of different values; and determine one or more TOA measurements used for positioning, sensing, or both based on the received reference signal.

An example server for positioning, sensing, or both performed, the server may comprise: a transceiver; a memory; and one or more processors communicatively coupled with the transceiver and the memory. The one or more processors may be configured to: determine a non-uniform reference signal configuration for a reference signal of positioning, sensing, or both, wherein the reference signal comprises a plurality of subcarriers, and wherein according to the non-uniform reference signal configuration, the reference signal is configured such that a frequency spacing between different pairs of neighboring subcarriers of the reference signal comprises a plurality of different values; and transmit the non-uniform reference signal configuration for determining one or more time of arrival (TOA) measurements based on the reference signal.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

Figure 1:
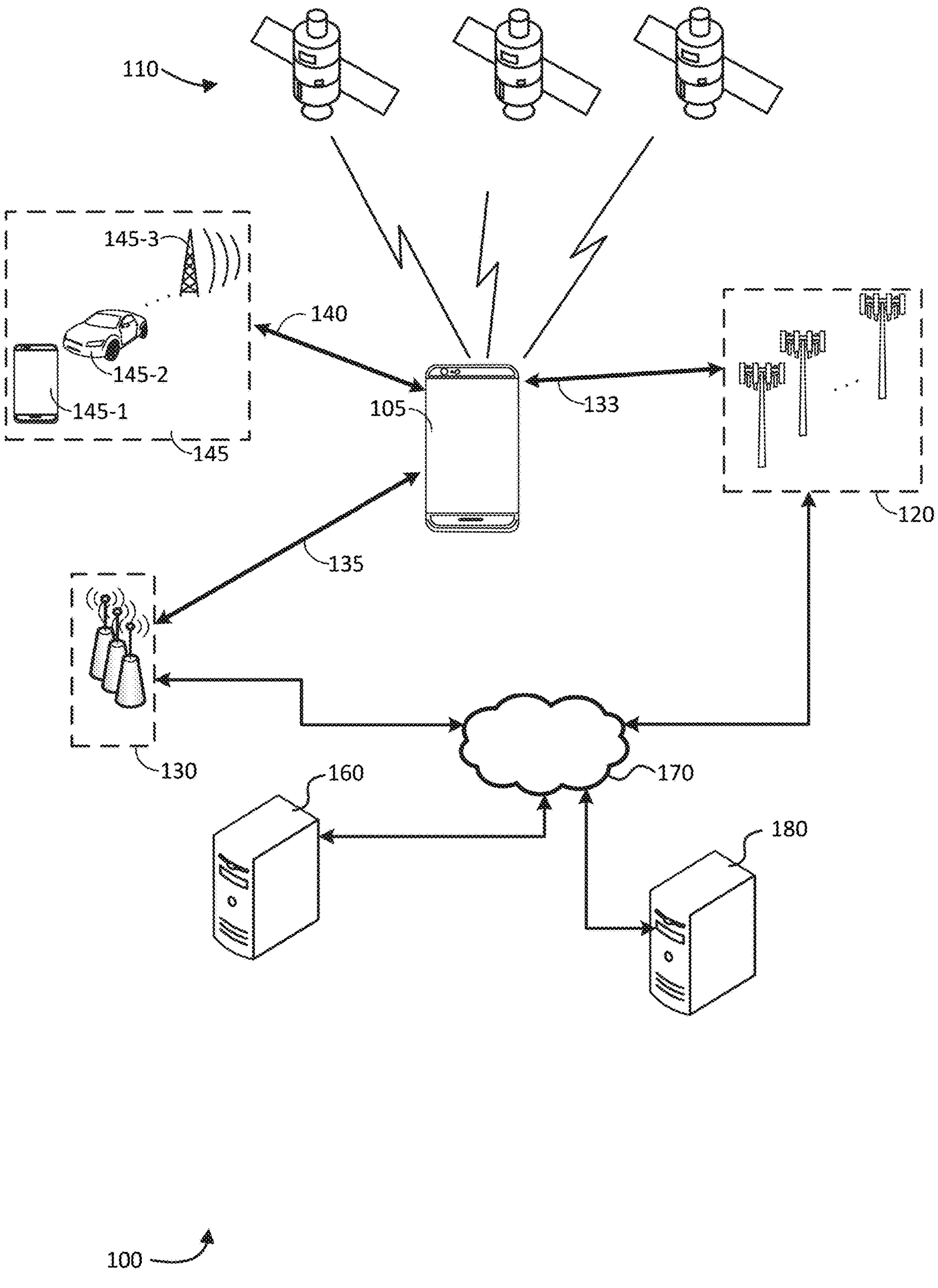
FIG. 1 is an illustration of a communication/positioning/sensing system, according to an embodiment.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. or as 110*a*, 110*b*, 110*c*, etc. When referring to such an element using only the first number, any instance of the element is to be understood (e.g., element 110 in the previous example would refer to elements 110-1, 110-2, and 110-3 or to elements 110*a*, 110*b*, and 110*c*).

DETAILED DESCRIPTION

The following description is directed to certain implementations for the purposes of describing innovative aspects of various embodiments. However, a person having ordinary skill in the art will readily recognize that the teachings herein can be applied in a multitude of different ways. The described implementations may be implemented in any device, system, or network that is capable of transmitting and receiving radio frequency (RF) signals according to any communication standard, such as any of the Institute of Electrical and Electronics Engineers (IEEE) 802.15.4 standards for ultra-wideband (UWB), IEEE 802.11 standards (including those identified as Wi-Fi® technologies), the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Rate Packet Data (HRPD), High Speed Packet Access (HSPA), High Speed Downlink Packet Access (HSDPA), High Speed Uplink Packet Access (HSUPA), Evolved High Speed Packet Access (HSPA+), Long Term Evolution (LTE), Advanced Mobile Phone System (AMPS), or other known signals that are used to communicate within a wireless, cellular or internet of things (IoT) network, such as a system utilizing 3G, 4G, 5G, 6G, or further implementations thereof, technology.

As used herein, an “RF signal” comprises an electromagnetic wave that transports information through the space between a transmitter (or transmitting device) and a receiver (or receiving device). As used herein, a transmitter may transmit a single “RF signal” or multiple “RF signals” to a receiver. However, the receiver may receive multiple “RF signals” corresponding to each transmitted RF signal due to the propagation characteristics of RF signals through multiple channels or paths.

Additionally, unless otherwise specified, references to “positioning reference signals,” “reference signals for positioning,” and the like may be used to refer to signals used for positioning of a mobile device, such as a user equipment (UE) in a 5G new radio (NR) network. As described in more detail herein, such signals may comprise any of a variety of signal types but may not necessarily be limited to a Positioning Reference Signal (PRS) as defined in relevant wireless standards. Additionally, unless otherwise specified, references to “sensing reference signals,” “reference signals for sensing,” and the like may be used to refer to signals used for RF sensing (also generically referred to herein as “sensing”) as described herein. A signal used for RF sensing and/or positioning may be generally referred to herein as a reference signal (RS). As described in more detail herein, such signals may comprise any of a variety of signal types but may not necessarily be limited to signals solely used for RF sensing.

As previously noted, sensing of objects and positioning of devices is being contemplated for use in various applications, including wireless networks such as cellular networks. For example, a reference signal (RS) may be received by a receiving device via the cellular networks for determining sensing and/or positioning measurements. When using cellular networks to perform sensing and positioning, unlike performing communications between wireless devices of the network, a primary interest of RF sensing is estimating delays of reflection and line of sight (LOS) paths of the received RS (e.g., time of arrival (TOA)-based sensing where TOA measurements may be determined based on a covariance matrix of the received reference signals) and an accurate overall channel impulse response (CIR)/channel frequency response (CFR) estimation may be less of interest. Thus, in delay estimation applications, when configuring the resource elements of the RS, an uniform subcarrier spacing pattern (e.g., comb-2, comb-4, comb-6) may be excessive in terms of the processing complexity and overhead. Embodiments herein leverage non-uniform subcarrier spacing pattern for configuring the RS where frequency spacing between different pairs of neighboring subcarriers of the RS include a plurality of different values. As will be discussed in detail below, using the non-uniformly configured RS for sensing and/or positioning can produce similar performance compared with using existing uniformly configured RSs, with smaller number of resource elements used, higher power boosting for each resource element, and lower processing overhead and latency. Additional details will be provided after a discussion of applicable technology.

FIG. 1 is a simplified illustration of a wireless system capable of communication, positioning, and sensing, referred to herein as a “communication/positioning/sensing system” 100 in which a mobile device 105, network function server 160, and/or other components of the communication/positioning/sensing system 100 can use the techniques provided herein for RF sensing and/or positioning, according to an embodiment. (That said, embodiments are not necessarily limited to such a system.) The techniques described herein may be implemented by one or more components of the communication/positioning/sensing system 100. The communication/positioning/sensing system 100 can include: a mobile device 105; one or more satellites 110 (also referred to as space vehicles (SVs)), which may include Global Navigation Satellite System (GNSS) satellites (e.g., satellites of the Global Positioning System (GPS), GLONASS, Galileo, Beidou, etc.) and or Non-Terrestrial Network (NTN) satellites; base stations 120; access points (APs) 130; network function server 160; network 170; and external client 180. Generally put, the communication/positioning/sensing system 100 may be capable of enabling communication between the mobile device 105 and other devices, positioning of the mobile device 105 and/or other devices, performing RF sensing by the mobile device 105 and/or other devices, or a combination thereof. For example, the communication/positioning/sensing system 100 can estimate a location of the mobile device 105 based on RF signals received by and/or sent from the mobile device 105 and known locations of other components (e.g., GNSS satellites 110, base stations 120, APs 130) transmitting and/or receiving the RF signals. Additionally or alternatively, wireless devices such as the mobile device 105, base stations 120, and satellites 110 (and/or other NTN platforms, which may be implemented on airplanes, drones, balloons, etc.) can be utilized to perform positioning (e.g., of one or more wireless devices) and/or perform RF sensing (e.g., of one or more objects by using RF signals transmitted by one or more wireless devices).

It should be noted that FIG. 1 provides only a generalized illustration of various components, any or all of which may be utilized as appropriate, and each of which may be duplicated as necessary. Specifically, although only one mobile device 105 is illustrated, it will be understood that many UEs (e.g., hundreds, thousands, millions, etc.) may utilize the communication/positioning/sensing system 100. Similarly, the communication/positioning/sensing system 100 may include a larger or smaller number of base stations 120 and/or APs 130 than illustrated in FIG. 1. The illustrated connections that connect the various components in the communication/positioning/sensing system 100 comprise data and signaling connections which may include additional (intermediary) components, direct or indirect physical and/or wireless connections, and/or additional networks. Furthermore, components may be rearranged, combined, separated, substituted, and/or omitted, depending on desired functionality. In some embodiments, for example, the external client 180 may be directly connected to network function server 160. A person of ordinary skill in the art will recognize many modifications to the components illustrated.

Depending on desired functionality, the network 170 may comprise any of a variety of wireless and/or wireline networks. The network 170 can, for example, comprise any combination of public and/or private networks, local and/or wide-area networks, and the like. Furthermore, the network 170 may utilize one or more wired and/or wireless communication technologies. In some embodiments, the network 170 may comprise a cellular or other mobile network, a wireless local area network (WLAN), a wireless wide-area network (WWAN), and/or the Internet, for example. Examples of network 170 include a Long-Term Evolution (LTE) wireless network, a Fifth Generation (5G) wireless network (also referred to as New Radio (NR) wireless network or 5G NR wireless network), a Wi-Fi WLAN, and the Internet. LTE, 5G and NR are wireless technologies defined, or being defined, by the 3rd Generation Partnership Project (3GPP). In and LTE, 5G, or other cellular network, mobile device 105 may be referred to as a user equipment (UE). Network 170 may also include more than one network and/or more than one type of network.

The base stations 120 and access points (APs) 130 may be communicatively coupled to the network 170. In some embodiments, the base station 120*s* may be owned, maintained, and/or operated by a cellular network provider, and may employ any of a variety of wireless technologies, as described herein below. Depending on the technology of the network 170, a base station 120 may comprise a node B, an Evolved Node B (eNodeB or eNB), a base transceiver station (BTS), a radio base station (RBS), an NR NodeB (gNB), a Next Generation eNB (ng-eNB), or the like. A base station 120 that is a gNB or ng-eNB may be part of a Next Generation Radio Access Network (NG-RAN) which may connect to a 5G Core Network (5GC) in the case that Network 170 is a 5G network. The functionality performed by a base station 120 in earlier-generation networks (e.g., 3G and 4G) may be separated into different functional components (e.g., radio units (RUs), distributed units (DUs), and central units (CUs)) and layers (e.g., L1/L2/L3) in view Open Radio Access Networks (O-RAN) and/or Virtualized Radio Access Network (V-RAN or vRAN) in 5G or later networks, which may be executed on different devices at different locations connected, for example, via fronthaul, midhaul, and backhaul connections. As referred to herein, a "base station" (or ng-eNB, gNB, etc.) may include any or all of these functional components. An AP 130 may comprise a Wi-Fi AP or a Bluetooth® AP or an AP having cellular capabilities (e.g., 4G LTE and/or 5G NR), for example. Thus, mobile device 105 can send and receive information with network-connected devices, such as network function server 160, by accessing the network 170 via a base station 120 using a first communication link 133. Additionally or alternatively, because APs 130 also may be communicatively coupled with the network 170, mobile device 105 may communicate with network-connected and Internet-connected devices, including network function server 160, using a second communication link 135, or via one or more other mobile devices 145.

As used herein, the term "base station" may generically refer to a single physical transmission point, or multiple co-located physical transmission points, which may be located at a base station 120. A Transmission Reception Point (TRP) (also known as transmit/receive point) corresponds to this type of transmission point, and the term "TRP" may be used interchangeably herein with the terms "gNB," "ng-eNB," and "base station." In some cases, a base station 120 may comprise multiple TRPs—e.g. with each TRP associated with a different antenna or a different antenna array for the base station 120. As used herein, the transmission functionality of a TRP may be performed with a transmission point (TP) and/or the reception functionality of a TRP may be performed by a reception point (RP), which may be physically separate or distinct from a TP. That said, a TRP may comprise both a TP and an RP. Physical transmission points may comprise an array of antennas of a base station 120 (e.g., as in a Multiple Input-Multiple Output (MIMO) system and/or where the base station employs beamforming). According to aspects of applicable 5G cellular standards, a base station 120 (e.g., gNB) may be capable of transmitting different "beams" in different directions, and performing "beam sweeping" in which a signal is transmitted in different beams, along different directions (e.g., one after the other). The term "base station" may additionally refer to multiple non-co-located physical transmission points, the physical transmission points may be a Distributed Antenna System (DAS) (a network of spatially separated antennas connected to a common source via a transport medium) or a Remote Radio Head (RRH) (a remote base station connected to a serving base station).

Satellites 110 may be utilized for positioning in communication in one or more way. For example, satellites 110 (also referred to as space vehicles (SVs)) may be part of a Global Navigation Satellite System (GNSS) such as the Global Positioning System (GPS), GLONASS, Galileo or Beidou. Positioning using RF signals from GNSS satellites may comprise measuring multiple GNSS signals at a GNSS receiver of the mobile device 105 to perform code-based and/or carrier-based positioning, which can be highly accurate. Additionally or alternatively, satellites 110 may be utilized for NTN-based positioning, in which satellites 110 may functionally operate as TRPs (or TPs) of a network (e.g., LTE and/or NR network) and may be communicatively coupled with network 170. In particular, reference signals (e.g., PRS) transmitted by satellites 110 NTN-based positioning may be similar to those transmitted by base stations 120, and may be coordinated by a network function server 160, which may operate as a location server. In some embodiments, satellites 110 used for NTN-based positioning may be different than those used for GNSS-based positioning. In some embodiments NTN nodes may include non-terrestrial vehicles such as airplanes, balloons, drones, etc., which may be in addition or as an alternative to NTN satellites. NTN satellites 110 and/or other NTN platforms may be further leveraged to perform RF sensing. As described in more detail hereafter, satellites may use a JCS symbol in an Orthogonal Frequency-Division Multiplexing (OFDM) waveform to allow both RF sensing and/or positioning, and communication.

The network function server 160 may comprise one or more servers and/or other computing devices configured to provide a network-managed and/or network-assisted function, such as operating as a location server and/or sensing server. A location server, for example, may determine an estimated location of mobile device 105 and/or provide data (e.g., "assistance data") to mobile device 105 to facilitate location measurement and/or location determination by mobile device 105. According to some embodiments, a location server may comprise a Home Secure User Plane Location (SUPL) Location Platform (H-SLP), which may support the SUPL user plane (UP) location solution defined by the Open Mobile Alliance (OMA) and may support location services for mobile device 105 based on subscription information for mobile device 105 stored in the location server. In some embodiments, the location server may comprise, a Discovered SLP (D-SLP) or an Emergency SLP (E-SLP). The location server may also comprise an Enhanced Serving Mobile Location Center (E-SMLC) that supports location of mobile device 105 using a control plane (CP) location solution for LTE radio access by mobile device 105. The location server may further comprise a Location Management Function (LMF) that supports location of mobile device 105 using a control plane (CP) location solution for NR or LTE radio access by mobile device 105.

Similarly, the network function server 160, may function as a sensing server. A sensing server can be used to coordinate and/or assist in the coordination of sensing of one or more objects (also referred to herein as "targets") by one or more wireless devices in the communication/positioning/sensing system 100. This can include the mobile device 105, base stations 120, APs 130, other mobile devices 145, satellites 110, or any combination thereof. Wireless devices capable of performing RF sensing may be referred to herein as "sensing nodes." To perform RF sensing, a sensing server may coordinate sensing sessions in which one or more RF sensing nodes may perform RF sensing by transmitting RF signals (e.g., reference signals (RSs)), and measuring reflected signals, or "echoes," comprising reflections of the transmitted RF signals off of one or more objects/targets. Reflected signals and object/target detection may be determined, for example, from channel state information (CSI) received at a receiving device. Sensing may comprise (i) monostatic sensing using a single device as a transmitter (of RF signals) and receiver (of reflected signals); (ii) bistatic sensing using a first device as a transmitter and a second device as a receiver; or (iii) multi-static sensing using a plurality of transmitters and/or a plurality of receivers. To facilitate sensing (e.g., in a sensing session among one or more sensing nodes), a sensing server may provide data (e.g., "assistance data") to the sensing nodes to facilitate RS transmission and/or measurement, object/target detection, or any combination thereof. Such data may include an RS configuration indicating which resources (e.g., time and/or frequency resources) may be used (e.g., in a sensing session) to transmit RS for RF sensing. According to some embodiments, a sensing server may comprise a Sensing Management Function (SMF).

Although terrestrial components such as APs 130 and base stations 120 may be fixed, embodiments are not so limited. Mobile components may be used. For example, in some embodiments, a location of the mobile device 105 may be estimated at least in part based on measurements of RF signals 140 communicated between the mobile device 105 and one or more other mobile devices 145, which may be mobile or fixed. As illustrated, other mobile devices may include, for example, a mobile phone 145-1, vehicle 145-2, static communication/positioning device 145-3, or other static and/or mobile device capable of providing wireless signals used for positioning the mobile device 105, or a combination thereof. Wireless signals from mobile devices 145 used for positioning of the mobile device 105 may comprise RF signals using, for example, Bluetooth® (including Bluetooth Low Energy (BLE)), IEEE 802.11x (e.g., Wi-Fi®), Ultra Wideband (UWB), IEEE 802.15x, or a combination thereof. Mobile devices 145 may additionally or alternatively use non-RF wireless signals for positioning of the mobile device 105, such as infrared signals or other optical technologies.

An estimated location of mobile device 105 can be used in a variety of applications—e.g., to assist direction finding or navigation for a user of mobile device 105 or to assist another user (e.g., associated with external client 180) to locate mobile device 105. A "location" is also referred to herein as a "location estimate", "estimated location", "location", "position", "position estimate", "position fix", "estimated position", "location fix" or "fix". The process of determining a location may be referred to as "positioning," "position determination," "location determination," or the like. A location of mobile device 105 may comprise an absolute location of mobile device 105 (e.g. a latitude and longitude and possibly altitude) or a relative location of mobile device 105 (e.g. a location expressed as distances north or south, east or west and possibly above or below some other known fixed location (including, e.g., the location of a base station 120 or AP 130) or some other location such as a location for mobile device 105 at some known previous time, or a location of a mobile device 145 (e.g., another UE) at some known previous time). A location may be specified as a geodetic location comprising coordinates which may be absolute (e.g., latitude, longitude and optionally altitude), relative (e.g., relative to some known absolute location) or local (e.g., X, Y and optionally Z coordinates according to a coordinate system defined relative to a local area such a factory, warehouse, college campus, shopping mall, sports stadium or convention center). A location may instead be a civic location and may then comprise one or more of a street address (e.g., including names or labels for a country, state, county, city, road and/or street, and/or a road or street number), and/or a label or name for a place, building, portion of a building, floor of a building, and/or room inside a building etc. A location may further include an uncertainty or error indication, such as a horizontal and possibly vertical distance by which the location is expected to be in error or an indication of an area or volume (e.g., a circle or ellipse) within which mobile device 105 is expected to be located with some level of confidence (e.g., 95% confidence).

The external client 180 may be a web server or remote application that may have some association with mobile device 105 (e.g., may be accessed by a user of mobile device 105) or may be a server, application, or computer system providing a location service to some other user or users which may include obtaining and providing the location of mobile device 105 (e.g. to enable a service such as friend or relative finder, or child or pet location). Additionally or alternatively, the external client 180 may obtain and provide the location of mobile device 105 to an emergency services provider, government agency, etc.

Figure 2:
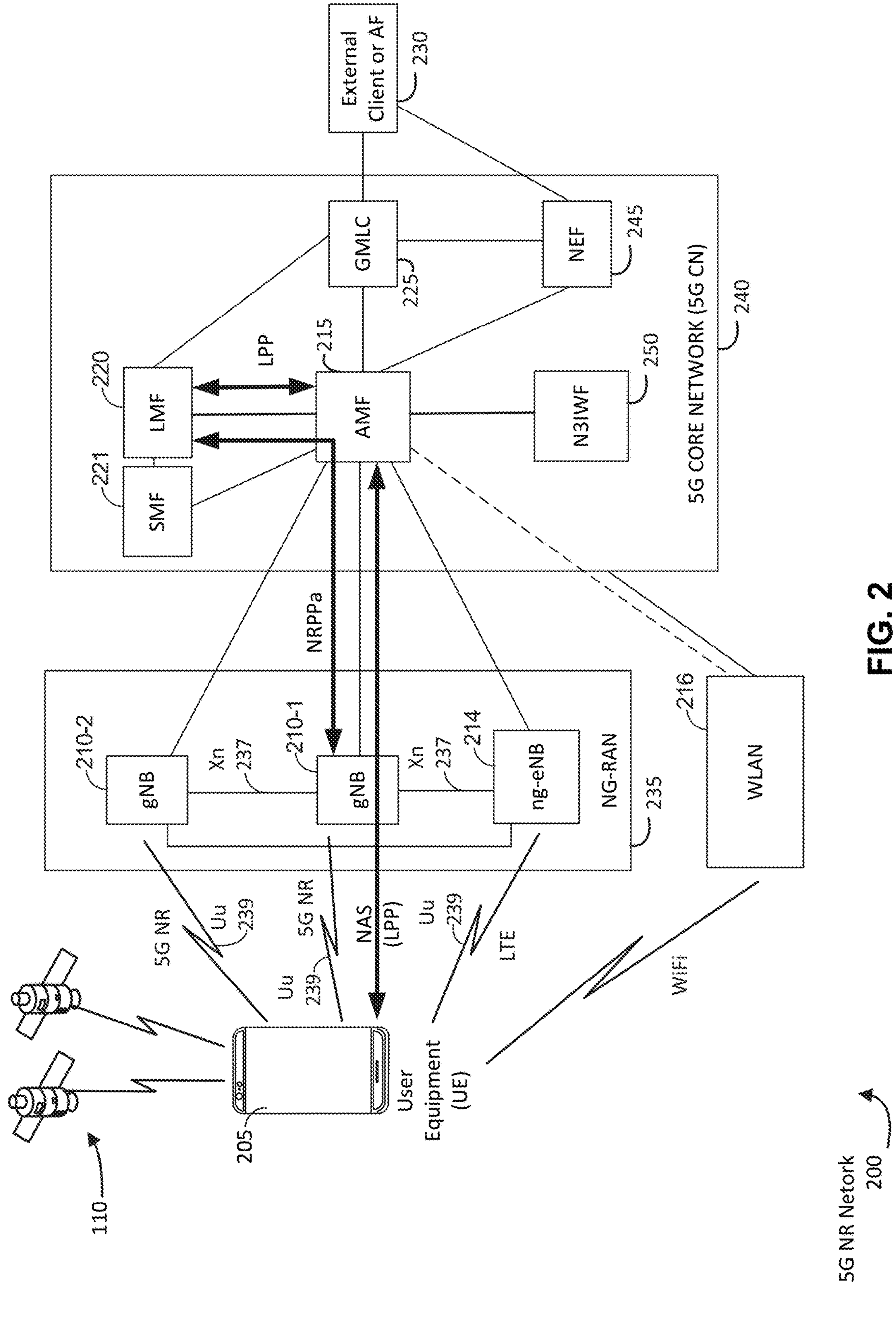
FIG. 2 is diagram of a fifth-generation new radio (5G NR) network, according to an embodiment.

As previously noted, the example communication/positioning/sensing system 100 can be implemented using a wireless communication network, such as an LTE-based or 5G NR-based network, or a future 6G network. FIG. 2 shows a diagram of a 5G NR network 200, illustrating an embodiment of a wireless system (e.g., communication/positioning/sensing system 100) implemented in 5G NR. The 5G NR network 200 may be configured to enable wireless communication, determine the location of a UE 205 (which may correspond to the mobile device 105 of FIG. 1), perform RF sensing, or a combination thereof, by using access nodes, which may include NR NodeB (gNB) 210-1 and 210-2 (collectively and generically referred to herein as gNBs 210), ng-eNB 214, and/or WLAN 216. These access nodes can use RF signaling to enable the communication, implement one or more positioning methods, and/or implement RF sensing. The gNBs 210 and/or the ng-eNB 214 may correspond with base stations 120 of FIG. 1, and the WLAN 216 may correspond with one or more access points 130 of FIG. 1. Optionally, the 5G NR network 200 additionally may be configured to determine the location of a UE 205 by using an LMF 220 (which may correspond with location server 160) to implement the one or more positioning methods. The SMF 221 may coordinate RF sensing by the 5G NR network 200. Here, the 5G NR network 200 comprises a UE 205, and components of a 5G NR network comprising a Next Generation (NG) Radio Access Network (RAN) (NG-RAN) 235 and a 5G Core Network (5G CN) 240. A 5GNR network 200 may also be called a 5G network and/or an NR network; NG-RAN 235 may be referred to as a 5G RAN or as an NR RAN; and 5G CN 240 may be referred to as an NG Core network. Additional components of the 5G NR network 200 are described below. The 5G NR network 200 may include additional or alternative components.

The 5G NR network 200 may further utilize information from satellites 110. As previously indicated, satellites 110 may comprise GNSS satellites from a GNSS system like Global Positioning System (GPS) or similar system (e.g. GLONASS, Galileo, Beidou, Indian Regional Navigational Satellite System (IRNSS)). Additionally or alternatively, satellites 110 may comprise NTN satellites that may be communicatively coupled with the LMF 220 and may operatively function as a TRP (or TP) in the NG-RAN 235. As such, satellites 110 may be in communication with one or more gNB 210.

It should be noted that FIG. 2 provides only a generalized illustration of various components, any or all of which may be utilized as appropriate, and each of which may be duplicated or omitted as necessary. Specifically, although only one UE 205 is illustrated, it will be understood that many UEs (e.g., hundreds, thousands, millions, etc.) may utilize the 5G NR network 200. Similarly, the 5G NR network 200 may include a larger (or smaller) number of satellites 110, gNBs 210, ng-eNBs 214, Wireless Local Area Networks (WLANs) 216, Access and mobility Management Functions (AMF)s 215, external clients 230, and/or other components. The illustrated connections that connect the various components in the 5GNR network 200 include data and signaling connections which may include additional (intermediary) components, direct or indirect physical and/or wireless connections, and/or additional networks. Furthermore, components may be rearranged, combined, separated, substituted, and/or omitted, depending on desired functionality.

The UE 205 may comprise and/or be referred to as a device, a mobile device, a wireless device, a mobile terminal, a terminal, a mobile station (MS), a Secure User Plane Location (SUPL)-Enabled Terminal (SET), or by some other name. Moreover, UE 205 may correspond to a cellphone, smartphone, laptop, tablet, personal data assistant (PDA), navigation device, Internet of Things (IoT) device, or some other portable or moveable device. Typically, though not necessarily, the UE 205 may support wireless communication using one or more Radio Access Technologies (RATs) such as using GSM, CDMA, W-CDMA, LTE, High Rate Packet Data (HRPD), IEEE 802.11 Wi-Fi®, Bluetooth, Worldwide Interoperability for Microwave Access (WiMAX™), 5G NR (e.g., using the NG-RAN 235 and 5G CN 240), etc. The UE 205 may also support wireless communication using a WLAN 216 which (like the one or more RATs, and as previously noted with respect to FIG. 1) may connect to other networks, such as the Internet. The use of one or more of these RATs may allow the UE 205 to communicate with an external client 230 (e.g., via elements of 5G CN 240 not shown in FIG. 2, or possibly via a Gateway Mobile Location Center (GMLC) 225) and/or allow the external client 230 to receive location information regarding the UE 205 (e.g., via the GMLC 225). The external client 230 of FIG. 2 may correspond to external client 180 of FIG. 1, as implemented in or communicatively coupled with a 5G NR network.

The UE 205 may include a single entity or may include multiple entities, such as in a personal area network where a user may employ audio, video and/or data I/O devices, and/or body sensors and a separate wireline or wireless modem. An estimate of a location of the UE 205 may be referred to as a location, location estimate, location fix, fix, position, position estimate, or position fix, and may be geodetic, thus providing location coordinates for the UE 205 (e.g., latitude and longitude), which may or may not include an altitude component (e.g., height above sea level, height above or depth below ground level, floor level or basement level). Alternatively, a location of the UE 205 may be expressed as a civic location (e.g., as a postal address or the designation of some point or small area in a building such as a particular room or floor). A location of the UE 205 may also be expressed as an area or volume (defined either geodetically or in civic form) within which the UE 205 is expected to be located with some probability or confidence level (e.g., 67%, 95%, etc.). A location of the UE 205 may further be a relative location comprising, for example, a distance and direction or relative X, Y (and Z) coordinates defined relative to some origin at a known location which may be defined geodetically, in civic terms, or by reference to a point, area, or volume indicated on a map, floor plan or building plan. In the description contained herein, the use of the term location may comprise any of these variants unless indicated otherwise. When computing the location of a UE, it is common to solve for local X, Y, and possibly Z coordinates and then, if needed, convert the local coordinates into absolute ones (e.g. for latitude, longitude and altitude above or below mean sea level).

Base stations in the NG-RAN 235 shown in FIG. 2 may correspond to base stations 120 in FIG. 1 and may include gNBs 210. Pairs of gNBs 210 in NG-RAN 235 may be connected to one another (e.g., directly as shown in FIG. 2 or indirectly via other gNBs 210). The communication interface between base stations (gNBs 210 and/or ng-eNB 214) may be referred to as an Xn interface 237. Access to the 5G network is provided to UE 205 via wireless communication between the UE 205 and one or more of the gNBs 210, which may provide wireless communications access to the 5G CN 240 on behalf of the UE 205 using 5G NR. The wireless interface between base stations (gNBs 210 and/or ng-eNB 214) and the UE 205 may be referred to as a Uu interface 239. 5G NR radio access may also be referred to as NR radio access or as 5G radio access. In FIG. 2, the serving gNB for UE 205 is assumed to be gNB 210-1, although other gNBs (e.g. gNB 210-2) may act as a serving gNB if UE 205 moves to another location or may act as a secondary gNB to provide additional throughput and bandwidth to UE 205.

Base stations in the NG-RAN 235 shown in FIG. 2 may also or instead include a next generation evolved Node B, also referred to as an ng-eNB, 214. Ng-eNB 214 may be connected to one or more gNBs 210 in NG-RAN 235—e.g. directly or indirectly via other gNBs 210 and/or other ng-eNBs. An ng-eNB 214 may provide LTE wireless access and/or evolved LTE (eLTE) wireless access to UE 205. Some gNBs 210 (e.g. gNB 210-2) and/or ng-eNB 214 in FIG. 2 may be configured to function as positioning-only beacons which may transmit signals (e.g., Positioning Reference Signal (PRS)) and/or may broadcast assistance data to assist positioning of UE 205 but may not receive signals from UE 205 or from other UEs. Some gNBs 210 (e.g., gNB 210-2 and/or another gNB not shown) and/or ng-eNB 214 may be configured to function as detecting-only nodes may scan for signals containing, e.g., PRS data, assistance data, or other location data. Such detecting-only nodes may not transmit signals or data to UEs but may transmit signals or data (relating to, e.g., PRS, assistance data, or other location data) to other network entities (e.g., one or more components of 5G CN 240, external client 230, or a controller) which may receive and store or use the data for positioning of at least UE 205. It is noted that while only one ng-eNB 214 is shown in FIG. 2, some embodiments may include multiple ng-eNBs 214. Base stations (e.g., gNBs 210 and/or ng-eNB 214) may communicate directly with one another via an Xn communication interface. Additionally or alternatively, base stations may communicate directly or indirectly with other components of the 5G NR network 200, such as the LMF 220 and AMF 215.

5G NR network 200 may also include one or more WLANs 216 which may connect to a Non-3GPP InterWorking Function (N3IWF) 250 in the 5G CN 240 (e.g., in the case of an untrusted WLAN 216). For example, the WLAN 216 may support IEEE 802.11 Wi-Fi access for UE 205 and may comprise one or more Wi-Fi APs (e.g., APs 130 of FIG. 1). Here, the N3IWF 250 may connect to other elements in the 5G CN 240 such as AMF 215. In some embodiments, WLAN 216 may support another RAT such as Bluetooth. The N3IWF 250 may provide support for secure access by UE 205 to other elements in 5G CN 240 and/or may support interworking of one or more protocols used by WLAN 216 and UE 205 to one or more protocols used by other elements of 5G CN 240 such as AMF 215. For example, N3IWF 250 may support IPSec tunnel establishment with UE 205, termination of IKEv2/IPSec protocols with UE 205, termination of N2 and N3 interfaces to 5G CN 240 for control plane and user plane, respectively, relaying of uplink (UL) and downlink (DL) control plane Non-Access Stratum (NAS) signaling between UE 205 and AMF 215 across an N1 interface. In some other embodiments, WLAN 216 may connect directly to elements in 5G CN 240 (e.g. AMF 215 as shown by the dashed line in FIG. 2) and not via N3IWF 250. For example, direct connection of WLAN 216 to 5GCN 240 may occur if WLAN 216 is a trusted WLAN for 5GCN 240 and may be enabled using a Trusted WLAN Interworking Function (TWIF) (not shown in FIG. 2) which may be an element inside WLAN 216. It is noted that while only one WLAN 216 is shown in FIG. 2, some embodiments may include multiple WLANs 216.

Access nodes may comprise any of a variety of network entities enabling communication between the UE 205 and the AMF 215. As noted, this can include gNBs 210, ng-eNB 214, WLAN 216, and/or other types of cellular base stations. However, access nodes providing the functionality described herein may additionally or alternatively include entities enabling communications to any of a variety of RATs not illustrated in FIG. 2, which may include non-cellular technologies. Thus, the term "access node," as used in the embodiments described herein below, may include but is not necessarily limited to a gNB 210, ng-eNB 214 or WLAN 216.

In some embodiments, an access node, such as a gNB 210, ng-eNB 214, and/or WLAN 216 (alone or in combination with other components of the 5G NR network 200), may be configured to, in response to receiving a request for location information from the LMF 220, obtain location measurements of uplink (UL) signals received from the ULE 205) and/or obtain downlink (DL) location measurements from the UE 205 that were obtained by UE 205 for DL signals received by UE 205 from one or more access nodes. As noted, while FIG. 2 depicts access nodes (gNB 210, ng-eNB 214, and WLAN 216) configured to communicate according to 5G NR, LTE, and Wi-Fi communication protocols, respectively, access nodes configured to communicate according to other communication protocols may be used, such as, for example, a Node B using a Wideband Code Division Multiple Access (WCDMA) protocol for a Universal Mobile Telecommunications Service (UMTS) Terrestrial Radio Access Network (UTRAN), an eNB using an LTE protocol for an Evolved UTRAN (E-UTRAN), or a Bluetooth® beacon using a Bluetooth protocol for a WLAN. For example, in a 4G Evolved Packet System (EPS) providing LTE wireless access to UE 205, a RAN may comprise an E-UTRAN, which may comprise base stations comprising eNBs supporting LTE wireless access. A core network for EPS may comprise an Evolved Packet Core (EPC). An EPS may then comprise an E-UTRAN plus an EPC, where the E-UTRAN corresponds to NG-RAN 235 and the EPC corresponds to 5GCN 240 in FIG. 2. The methods and techniques described herein for obtaining a civic location for UE 205 may be applicable to such other networks.

The gNBs 210 and ng-eNB 214 can communicate with an AMF 215, which, for positioning functionality, communicates with an LMF 220. The AMF 215 may support mobility of the UE 205, including cell change and handover of UE 205 from an access node (e.g., gNB 210, ng-eNB 214, or WLAN 216) of a first RAT to an access node of a second RAT. The AMF 215 may also participate in supporting a signaling connection to the UE 205 and possibly data and voice bearers for the UE 205. The LMF 220 may support positioning of the UE 205 using a CP location solution when UE 205 accesses the NG-RAN 235 or WLAN 216 and may support position procedures and methods, including UE assisted/UE based and/or network based procedures/methods, such as Assisted GNSS (A-GNSS), Observed Time Difference Of Arrival (OTDOA) (which may be referred to in NR as Time Difference Of Arrival (TDOA)), Frequency Difference Of Arrival (FDOA), Real Time Kinematic (RTK), Precise Point Positioning (PPP), Differential GNSS (DGNSS), Enhanced Cell ID (ECID), angle of arrival (AoA), angle of departure (AoD), WLAN positioning, round trip signal propagation delay (RTT), multi-cell RTT, and/or other positioning procedures and methods. The LMF 220 may also process location service requests for the UE 205, e.g., received from the AMF 215 or from the GMLC 225. The LMF 220 may be connected to AMF 215 and/or to GMLC 225. In some embodiments, a network such as 5GCN 240 may additionally or alternatively implement other types of location-support modules, such as an Evolved Serving Mobile Location Center (E-SMLC) or a SUPL Location Platform (SLP). It is noted that in some embodiments, at least part of the positioning functionality (including determination of a UE 205's location) may be performed at the UE 205 (e.g., by measuring downlink PRS (DL-PRS) signals transmitted by wireless nodes such as gNBs 210, ng-eNB 214 and/or WLAN 216, and/or using assistance data provided to the UE 205, e.g., by LMF 220).

The Gateway Mobile Location Center (GMLC) 225 may support a location request for the UE 205 received from an external client 230 and may forward such a location request to the AMF 215 for forwarding by the AMF 215 to the LMF 220. A location response from the LMF 220 (e.g., containing a location estimate for the UE 205) may be similarly returned to the GMLC 225 either directly or via the AMF 215, and the GMLC 225 may then return the location response (e.g., containing the location estimate) to the external client 230.

A Network Exposure Function (NEF) 245 may be included in 5GCN 240. The NEF 245 may support secure exposure of capabilities and events concerning 5GCN 240 and UE 205 to the external client 230, which may then be referred to as an Access Function (AF) and may enable secure provision of information from external client 230 to 5GCN 240. NEF 245 may be connected to AMF 215 and/or to GMLC 225 for the purposes of obtaining a location (e.g. a civic location) of UE 205 and providing the location to external client 230.

As further illustrated in FIG. 2, the LMF 220 may communicate with the gNBs 210 and/or with the ng-eNB 214 using an NR Positioning Protocol annex (NRPPa) as defined in 3GPP Technical Specification (TS) 38.455. NRPPa messages may be transferred between a gNB 210 and the LMF 220, and/or between an ng-eNB 214 and the LMF 220, via the AMF 215. As further illustrated in FIG. 2, LMF 220 and UE 205 may communicate using an LTE Positioning Protocol (LPP) as defined in 3GPP TS 37.355. Here, LPP messages may be transferred between the UE 205 and the LMF 220 via the AMF 215 and a serving gNB 210-1 or serving ng-eNB 214 for UE 205. For example, LPP messages may be transferred between the LMF 220 and the AMF 215 using messages for service-based operations (e.g., based on the Hypertext Transfer Protocol (HTTP)) and may be transferred between the AMF 215 and the UE 205 using a 5G NAS protocol. The LPP protocol may be used to support positioning of UE 205 using UE assisted and/or UE based position methods such as A-GNSS, RTK, TDOA, multi-cell RTT, AoD, and/or ECID. The NRPPa protocol may be used to support positioning of UE 205 using network-based position methods such as ECID, AoA, uplink TDOA (UL-TDOA) and/or may be used by LMF 220 to obtain location related information from gNBs 210 and/or ng-eNB 214, such as parameters defining DL-PRS transmission from gNBs 210 and/or ng-eNB 214.

In the case of UE 205 access to WLAN 216, LMF 220 may use NRPPa and/or LPP to obtain a location of UE 205 in a similar manner to that just described for UE 205 access to a gNB 210 or ng-eNB 214. Thus, NRPPa messages may be transferred between a WLAN 216 and the LMF 220, via the AMF 215 and N3IWF 250 to support network-based positioning of UE 205 and/or transfer of other location information from WLAN 216 to LMF 220. Alternatively, NRPPa messages may be transferred between N3IWF 250 and the LMF 220, via the AMF 215, to support network-based positioning of UE 205 based on location related information and/or location measurements known to or accessible to N3IWF 250 and transferred from N3IWF 250 to LMF 220 using NRPPa. Similarly, LPP and/or LPP messages may be transferred between the UE 205 and the LMF 220 via the AMF 215, N3IWF 250, and serving WLAN 216 for UE 205 to support UE assisted or UE based positioning of UE 205 by LMF 220.

Figure 3:
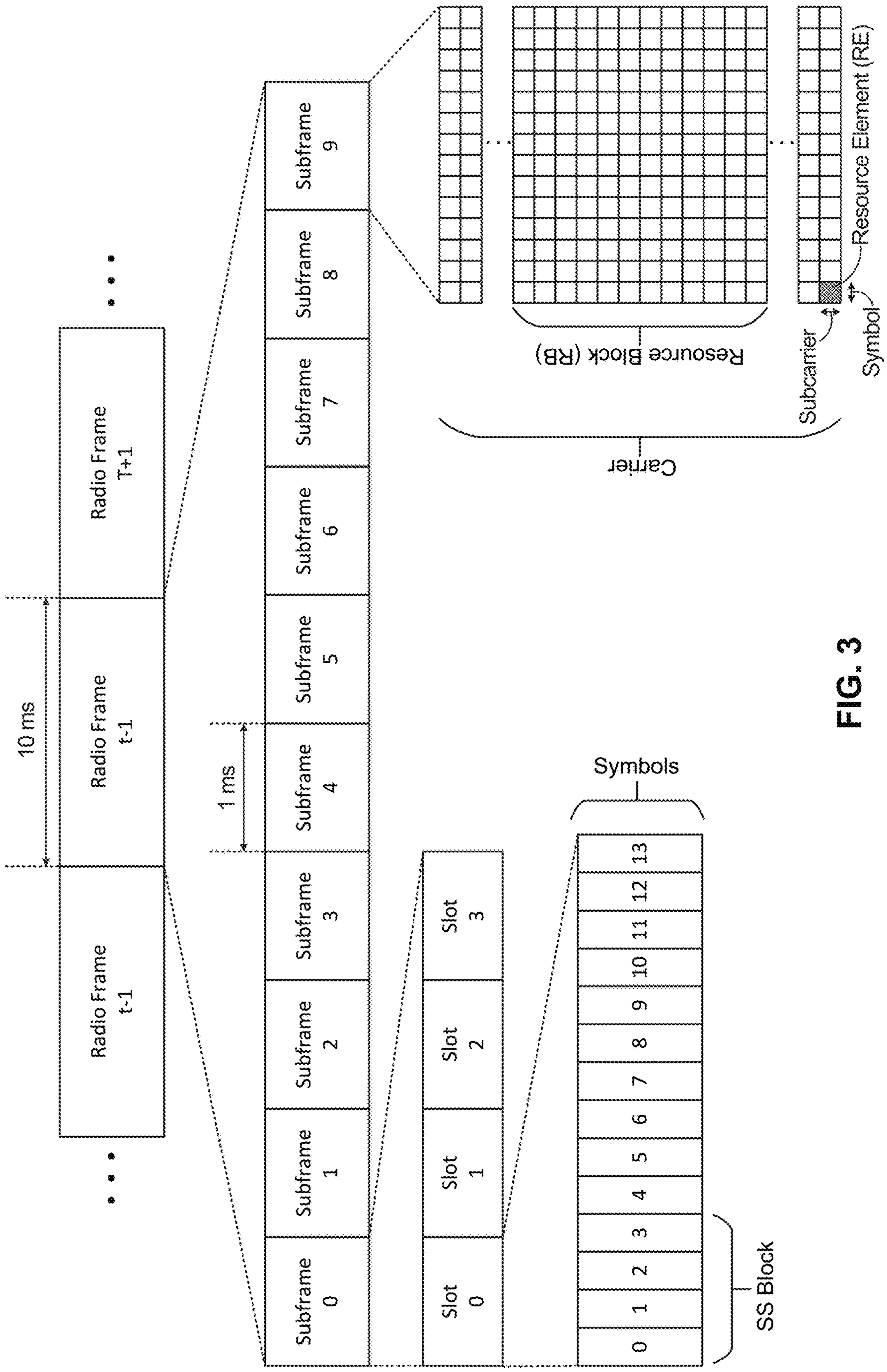
FIG. 3 is a diagram showing an example of a frame structure for NR and associated terminology.

As mentioned above, cellular networks such as 5G NR cellular networks can be used to determine the position of wireless devices, such as user equipments (UEs) and are expanding into RF sensing to be able to detect objects (including their location and speed) from reflections (or echoes) of RF signals reflecting from the objects. For example, FIG. 3 is a diagram showing an example of a frame structure for NR and associated terminology, which can serve as the basis for physical layer communication between the UE 105 and base stations/TRPs (e.g., gNBs 210 and/or ng-eNB 214). The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini slot may comprise a sub slot structure (e.g., 2, 3, or 4 symbols). Additionally shown in FIG. 3 is the complete OFDM of a subframe, showing how a subframe can be divided across both time and frequency into a plurality of Resource Blocks (RBs). A single RB can comprise a grid of Resource Elements (REs) spanning 14 symbols and 12 subcarriers.

Figure 4:
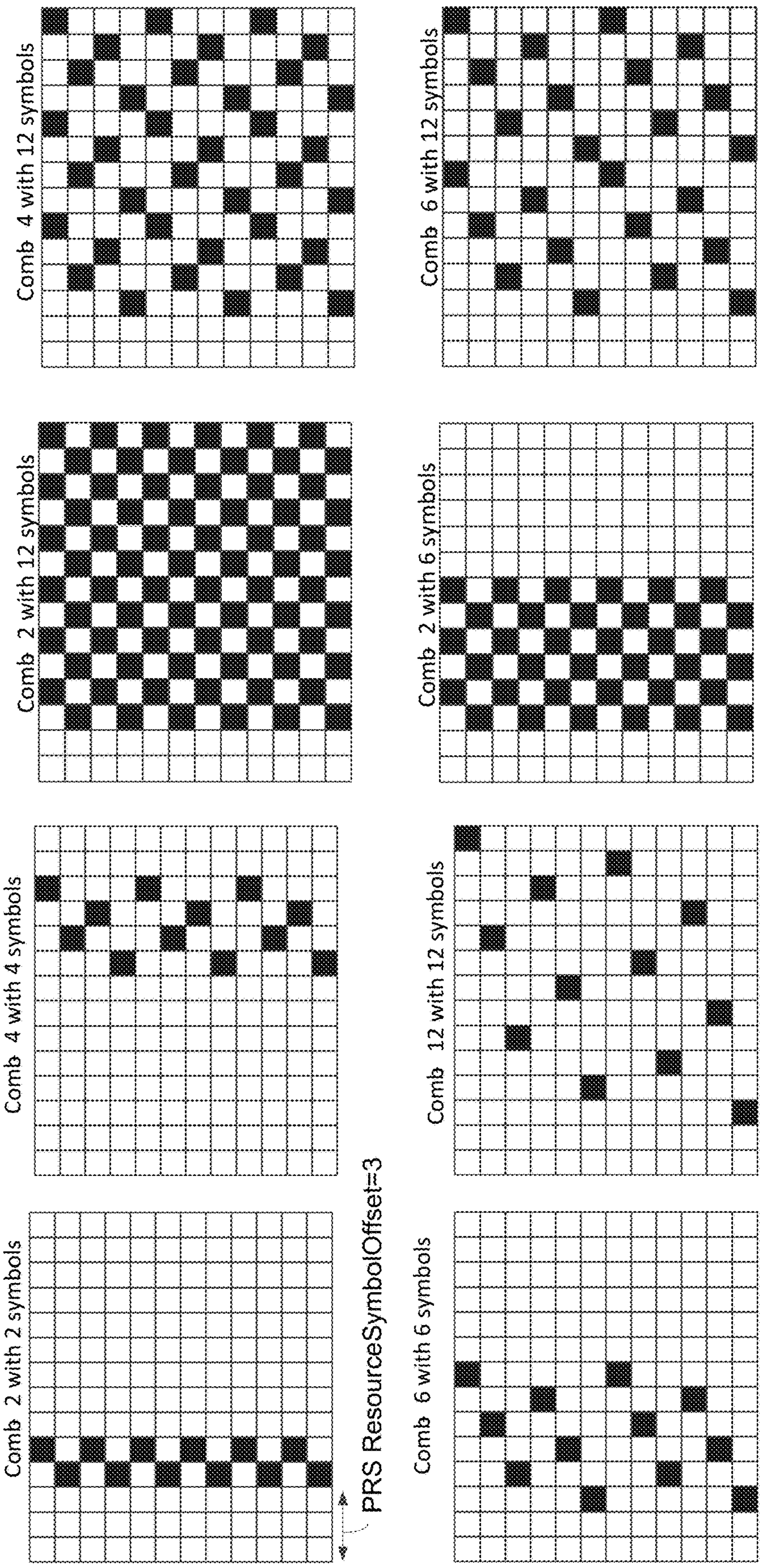
FIG. 4 is a diagram showing example combination (comb) structures, illustrating how RF signals may utilize different sets of resource elements, according to some embodiments.

When performing sensing and/or positioning (e.g., TOA-based sensing), a reference signal (RS) may be transmitted by wireless nodes (e.g., base stations 120) after appropriate configuration (e.g., by an Operations and Maintenance (O&M) server, a location server, and/or a SMF). With reference to the frame structure in FIG. 3, a collection of REs that are used for transmission of RS is referred to as a "RS resource." The collection of RE can span multiple RBs in the frequency domain and one or more consecutive symbols within a slot in the time domain, inside which pseudo-random Quadrature Phase Shift Keying (QPSK) sequences are transmitted from an antenna port of a TRP. In a given OFDM symbol in the time domain, a RS resource occupies consecutive RBs in the frequency domain. The transmission of a RS resource within a given RB has a particular combination, or "comb," size. (Comb size also may be referred to as the "comb density.") In existing technical schemes, a comb size "N" represents the subcarrier spacing (or frequency/tone spacing) within each symbol of a RS resource configuration, where the configuration uses every Nth subcarrier of certain symbols of an RB. For example, for comb-4, for each of the four symbols of the PRS resource configuration, REs corresponding to every fourth subcarrier (e.g., subcarriers 0, 4, 8) are used to transmit RS of the RS resource. Comb sizes of comb-2, comb-4, comb-6, and comb-12, for example, may be used in PRS. Examples of different comb sizes using with different numbers of symbols are provided in FIG. 4.

In the 5G NR positioning system 200 illustrated in FIG. 2, a TRP (gNB 210, ng-eNB 214, and/or WLAN 216) may transmit frames, or other physical layer signaling sequences, supporting RS signals (i.e. a DL-PRS) according to frame configurations as previously described, which may be measured and used for position determination of the UE 105. As noted, other types of wireless network nodes, including other UEs, may also be configured to transmit RS signals configured in a manner similar to (or the same as) that described above. Because transmission of a RS by a wireless network node may be directed to all UEs within radio range, the wireless network node may be considered to transmit (or broadcast) a RS.

As noted above, different from performing communications between wireless devices of the network, in delay estimation applications (e.g., TOA-based sensing), an accurate overall channel impulse response (CIR)/channel frequency response (CFR) estimation may be less of interest. Angle of arrival (AOA) estimation with antenna array and TOA-based sensing and/or positioning (e.g., TOA estimation with OFDM) have a common received signal model:

$$Y_k = \sum_{m=0}^{M-1} \alpha_m e^{-j2\pi k\tau_m} + w_k$$

where $\alpha_m$ denotes gain of mth path, $\tau_m$ denotes normalized angle $$\left(\frac{d \cdot \sin\theta_m}{\lambda}\right)$$

in the AOA estimation (where d is the antenna spacing) or normalized delay ($\Delta f \cdot t_m$) in the TOA-based sensing and/or positioning (where $\Delta f$ is the subcarrier spacing), and $w_k$ denotes Additive white Gaussian noise (AWGN). Similar to AOA estimation, in TOA-based sensing and/or positioning, the TOA measurements may be determined similarly based on a covariance matrix of the received RSs. Accordingly, configuring the REs of the RS using an uniform subcarrier spacing pattern (e.g., comb-2, comb-4, comb-6, where a frequency spacing between different pairs of neighboring subcarriers of the RS have a constant value) may be excessive in terms of the processing complexity and overhead if RSs having a specifically designed non-uniform subcarrier spacing pattern (also referred as "non-uniform patterned RSs") may have a same covariance matrix as the corresponding RSs having uniform subcarrier spacing pattern (also referred as "uniform patterned RSs") while using less subcarriers. The result also shows that using the non-uniform patterned RSs as disclosed herein may achieve a higher TOA resolution compared with using existing uniform patterned RSs when a same number of subcarriers are used.

To ensure having a same covariance matrix as the corresponding uniform patterned RSs, in non-uniform patterned RSs disclosed herein, the plurality of subcarriers of the non-uniform patterned RSs may be configured such that a frequency spacing between different pairs of neighboring subcarriers of the RS includes a plurality of different values. In some embodiments, the plurality of subcarriers of the non-uniform patterned RS may be configured according to a non-uniform sequence pattern determined based on a minimum hole sequence, a minimum redundancy sequence, a nested sequence, or any other suitable non-uniform pattern where a frequency spacing between different pairs of neighboring subcarriers of the RS includes a plurality of different values. In some embodiments, according to the non-uniform reference signal configuration, a frequency spacing between different pairs of neighboring and non-neighboring subcarriers of the reference signal comprises a set of contiguous integer numbers. As will be discussed in detail below, according to the configuration, the plurality of subcarriers of the non-uniform patterned RSs may be staggered (e.g., across multiple symbols in a case where the non-uniform patterned RS includes multiple symbols) or de-staggered (e.g., in a case where the non-uniform patterned RS includes one symbol).

For example, table 1 shows some non-exhaustive examples of minimum hole sequences of different orders. In minimum hole sequences, no two pairs of numbers in the sequence have the same different value. That is, the difference set (e.g., the different value of a pair of numbers) has no redundancy. In minimum hole sequences, the difference set may not be contiguous between zero and the length of the sequence (e.g., there are "holes" in the difference set values). For example, in an order-5 minimum hole sequence of {0,2,7,8,11}, the plurality of different values may comprise a set of contiguous integer numbers (e.g., 0, 1, 2, 3, . . . 8, 9, and 11), and there is no difference value of 10. Similarly, in another order-5 minimum hole sequence of {0,1,4,9,11}, there is no difference value of 6. Accordingly, compared with other sequences disclosed herein, at a given order number, minimum hole sequences are the shortest sequence (e.g., have the smallest maxim value of the sequence number).

TABLE 1

| Order | Length | Sequence |
|---|---|---|
| 2 | 1 | {0, 1} |
| 3 | 3 | {0, 1, 3} |
| 4 | 6 | {0, 1, 4, 6} |
| 5 | 11 | {0, 1, 4, 9, 11} |
| | | {0, 2, 7, 8, 11} |
| 6 | 17 | {0, 1, 4, 10, 12, 17} |
| | | {0, 1, 4, 10, 15, 17} |
| | | {0, 1, 8, 11, 13, 17} |
| | | {0, 1, 8, 12, 14, 17} |

Table 2 shows some non-exhaustive examples of minimum redundancy sequences of different orders. In minimum redundancy sequences, the difference set (e.g., the difference value of a pair of numbers) has all possible integer values between zero and the length of the sequence (e.g., the difference set values are "hole-free"). There can be more than one pair of numbers in the sequence with the same difference value (e.g., the difference set has redundancy). E.g., in an order-5 minimum redundancy sequence, the difference between 1 and 4, and 4 and 7 are both 3. Compared with other sequences disclosed herein, the minimum redundancy sequences minimize the redundancy.

TABLE 2

| Order | Length | Sequence |
|---|---|---|
| 2 | 1 | {0, 1} |
| 3 | 3 | {0, 1, 3} |
| 4 | 6 | (0, 1, 4, 6} |
| 5 | 9 | {0, 1, 4, 7, 9} |
| 6 | 13 | {0, 1, 6, 9, 11, 13} |

Table 3 shows some non-exhaustive examples of nested sequences of different orders. In nested sequences, the difference set (e.g., the difference value of a pair of numbers)

has all possible integer values between zero and the length of the sequence (e.g., the difference set values are "hole-free"), similar to the minimum redundancy sequences. Nested sequences have a closed form expression (e.g., only one possible nested sequence in every given order) and can be extended to any order and sequence length without requiring an exhaustive search.

TABLE 3

| Order | Length | Sequence |
|---|---|---|
| 4 | 4 | {0, 1, 2, 4} |
| 5 | 6 | {0, 1, 2, 4, 6} |
| 6 | 9 | {0, 1, 2, 3, 6, 9} |
| 7 | 12 | {0, 1, 2, 3, 6, 9, 12} |

Figure 5:
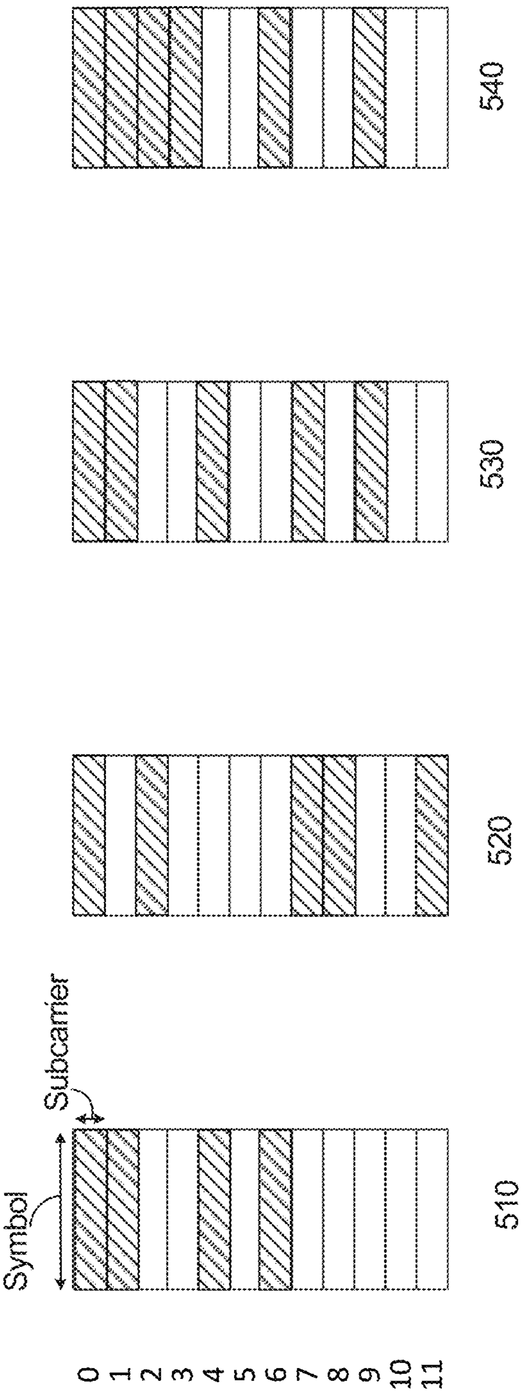
FIG. 5 is a diagram showing example of resource blocks including a single symbol of non-uniform patterned RSs configured according to non-uniform sequence patterns, according to some embodiments.

FIG. 5 is a diagram showing examples of resource blocks (RBs) including a single symbol of non-uniform patterned RSs configured according to non-uniform sequence patterns, according to some embodiments. For example, resource block 510 may include a grid of REs spanning 1 symbol and 12 subcarriers. Resource block 510 may be configured according to an order-4 minimum redundancy sequence (e.g., {0, 1, 4, 6}), where the $0^{th}$, $1^{st}$, $4^{th}$, and $6^{th}$ subcarriers are used to transmit the non-uniform patterned RS. Accordingly, the difference set (e.g., the frequency spacing) between the selected subcarriers may be {0, 1, 2, 3, 4, 5, 6}, the subcarrier usage is 33.3%, and the power boost can be 4.7 dB.

Resource block 520 may include a grid of REs spanning 1 symbol and 12 subcarriers. Resource block 520 may be configured according to an order-5 minimum hole sequence (e.g., {0, 2, 7, 8, 11}), where the $0^{th}$, $2^{nd}$, $7^{th}$, $8^{th}$, and $11^{th}$ subcarriers are used to transmit the non-uniform patterned RS. Accordingly, the difference set (e.g., the frequency spacing values) between the selected subcarriers may be {0, 1, 2, 3, 4, 5, 6, 7, 8, 9, 11}, the subcarrier usage is 41.7%, and the power boost can be 3.8 dB.

Resource block 530 may include a grid of REs spanning 1 symbol and 12 subcarriers. Resource block 530 may be configured according to an order-5 minimum redundancy sequence (e.g., {0, 1, 4, 7, 9}), where the $0^{th}$, $1^{st}$, $4^{th}$, $7^{th}$, and $9^{th}$ subcarriers are used to transmit the non-uniform patterned RS. Accordingly, the difference set (e.g., the frequency spacing values) between the selected subcarriers may be {0, 1, 2, 3, 4, 5, 6, 7, 8, 9}, the subcarrier usage is 41.7%, and the power boost can be 3.8 dB.

Resource block 540 may include a grid of REs spanning 1 symbol and 12 subcarriers. Resource block 540 may be configured according to an order-6 nested sequence (e.g., {0, 1, 2, 3, 6, 9}), where the $0^{th}$, $1^{st}$, $4^{th}$, and $6^{th}$ subcarriers are used to transmit the non-uniform patterned RS. Accordingly, the difference set (e.g., the frequency spacing values) between the selected subcarriers may be {0, 1, 2, 3, 4, 5, 6, 7, 8, 9, 10}, the subcarrier usage is 50%, and the power boost can be 3 dB.

Figure 6:
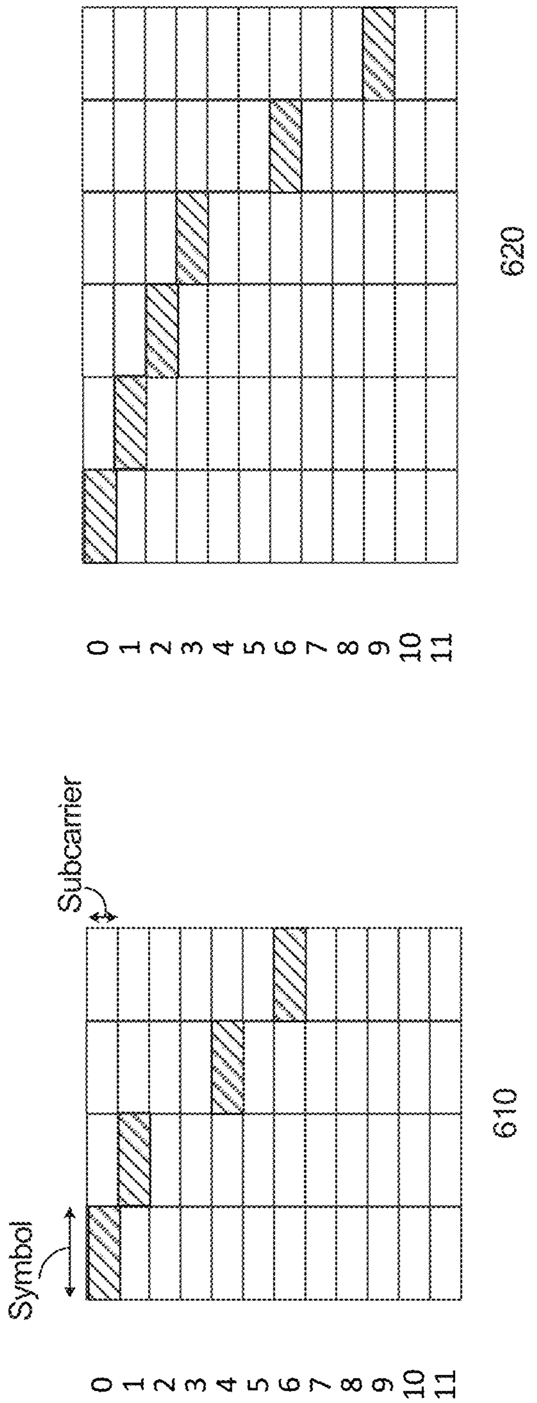
FIG. 6 is a diagram showing example of resource blocks including multiple symbols of non-uniform patterned RSs configured according to non-uniform sequence patterns, according to some embodiments.

FIG. 6 is a diagram showing example of RBs including multiple symbols of non-uniform patterned RSs configured according to non-uniform sequence patterns, according to some embodiments. In some embodiments, the non-uniform patterned RS may include a plurality of symbols, and the plurality of subcarriers of the non-uniform patterned RS may be spread across the plurality of symbols.

For example, resource block 610 may include a grid of REs spanning 4 symbols and 12 subcarriers. Resource block 610 may be configured according to an order-4 minimum redundancy sequence (e.g., {0, 1, 4, 6}) spread across the 4 symbols, where the $0^{th}$ subcarrier of the $1^{st}$ symbol; $1^{st}$ subcarrier of the $2^{nd}$ symbol; $4^{th}$ subcarrier of the $3^{rd}$ symbol; and $6^{th}$ subcarrier of the $4^{th}$ symbol are used to transmit the non-uniform patterned RS. Accordingly, the subcarrier usage is 8.3%, and the power boost can be 10.8 dB.

Resource block 620 may include a grid of REs spanning 6 symbols and 12 subcarriers. Resource block 620 may be configured according to an order-6 nested sequence (e.g., {0, 1, 2, 3, 6, 9}) spread across the 6 symbols, where the $0^{th}$ subcarrier of the $1^{st}$ symbol; $1^{st}$ subcarrier of the $2^{nd}$ symbol; $2^{nd}$ subcarrier of the $3^{rd}$ symbol; $3^{rd}$ subcarrier of the $4^{th}$ symbol; $6^{th}$ subcarrier of the $5^{th}$ symbol; and $9^{th}$ subcarrier of the $6^{th}$ symbol are used to transmit the non-uniform patterned RS. Accordingly, the subcarrier usage is 8.3%, and the power boost can be 10.8 dB.

Because the non-uniform patterned RS may have the same sensing performance (e.g., having a same covariance matrix) while using less subcarriers, compared with existing uniform patterned RSs, the non-uniform patterned RS may have higher power boosting per subcarrier and a larger number of frequency domain multiplexing (e.g., can allow multiplexing a larger number (e.g., 12) of non-uniform patterned RS resources).

It can be noted that, RBs 510, 520, 530, 540, 610, and 620 as shown in FIGS. 5 and 6 are none-limiting examples of RBs in non-uniform patterned RSs disclosed herein. In some embodiments, the non-uniform patterned RSs may be configured according to more than one non-uniform sequence patterns (e.g., using any combination of a minimum hole sequence, a minimum redundancy sequence, a nested sequence, and/or RBs with signal or multiple symbols).

In some embodiments, the non-uniform RS configuration may be determined by a server (e.g., an Operations and Maintenance (O&M) server, a location server, and/or a SMF) and may be transmitted to a wireless network node (e.g., a base station or a UE) for configuring the non-uniform patterned RS. In some embodiments, the non-uniform RS configuration may include a parameter associated with the non-uniform sequence pattern (e.g., the type of the non-uniform sequence pattern, a sequence order of the non-uniform sequence pattern, RE-level offset (for multiplexing), time-staggering pattern), a power boosting factor of the reference signal, or any combination thereof.

In some embodiments, the non-uniform RS configuration may be determined based on a capability report received from the receiving device (e.g., a wireless device, such as a UE). For example, the capability report may include a non-uniform RS pattern supported by the receiving device, a preference of the non-uniform reference signal pattern, a preferred power boosting factor, or any combination thereof. The capability report may be transmitted from the receiving device to the server or to the wireless network node using LTE positioning protocol (LPP) message(s). Accordingly, unlike the existing RS configurations which are configured in a cell-specific manner, the non-uniform RS configuration disclosed herein may be configured in a receiving device-specific manner (e.g., customized according to the capability/preference of the receiving device).

Figure 7:
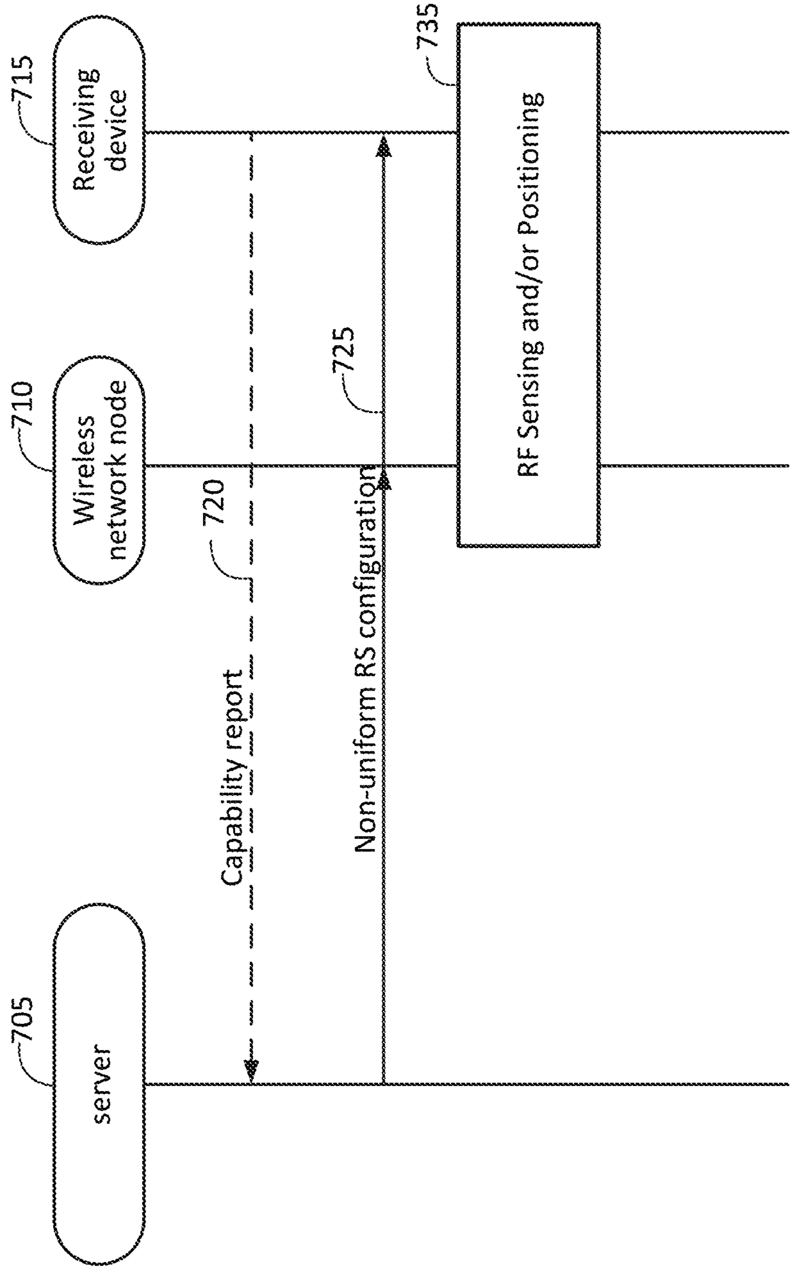
FIG. 7 is a flow diagram illustrating how radio frequency sensing for a target device (e.g., positioning the target device) may be performed using non-uniform patterned reference signals, according to some embodiments.

For example, FIG. 7 is a flow diagram illustrating how RF sensing and/or positioning may be performed using non-uniform patterned RSs, according to embodiments disclosed herein. In some embodiments, the RF sensing and/or positioning may be performed between a server 705, a wireless network node 710, and a receiving device 715. In some embodiments, server 705 may correspond to location server 160 in FIG. 1 (e.g., including an LMF), a proprietary server, a packet controller (e.g., including a session management function (SMF)) or any other suitable servers. Wireless network node 710 may correspond to base station 120 of FIG. 1 and/or gNB 210 of FIG. 2. Receiving device 715 may correspond to mobile device 145 or UE 105 in FIGS. 1 and 2 or any other wireless device suitable for performing the RF sensing and/or positioning disclosed herein. As will be discussed in detail below, the technical solution disclosed herein may be used for sensing and/or positioning receiving device 715 and/or sensing a target (detect objects including their location and speed) from reflections (or echoes) of RF signals reflecting from the target.

Starting at arrow 725, server 705 may transmit a non-uniform RS configuration to wireless network node 710 and/or receiving device 715 for RF sensing and/or positioning. For example, server 705 may transmit the non-uniform RS configuration to wireless network node 710 and receiving device 715 directly, or server 705 may transmit the non-uniform RS configuration to wireless network node 710 which may relay the non-uniform RS configuration to receiving device 715. As noted above, the non-uniform RS configuration may include a parameter associated with the non-uniform sequence pattern (e.g., the type of the non-uniform sequence pattern, a sequence order of the non-uniform sequence pattern, RE-level offset (for multiplexing), time-staggering pattern), a power boosting factor of the reference signal, or any combination thereof.

At block 735, the RF sensing and/or positioning may be performed using non-uniform patterned RSs configured according to the non-uniform RS configuration. For example, the non-uniform patterned RSs may be configured according to the non-uniform RS pattern discussed with regard to FIGS. 5 and 6. As noted above, in some embodiments, when sensing and/or positioning receiving device 715, the position of receiving device 715 may be determined based on TOA measurements determined using a covariance matrix of the RSs received by receiving device 715. Additionally or alternatively, in some embodiments, when RF sensing a target, the detection of the target (including their location and speed) may be determined based on TOA measurements determined using a covariance matrix of a reflection of the non-uniform patterned RSs, reflected by the target and received by receiving device 715. As discussed above, using the non-uniform patterned RSs disclosed herein for RF sensing and/or positioning may have a higher TOA resolution when a same number of subcarriers are used, higher power boosting for each subcarrier used, and may allow a larger number of RSs multiplexing compared with using existing uniform patterned RSs.

In some embodiments, prior to arrow 725, at arrow 720, receiving device 715 may transmit a capability report to server 705 and/or wireless network node 710. As noted above, the capability report may include a non-uniform RS pattern supported by receiving device 715, a preference of the non-uniform reference signal pattern, a preferred power boosting factor, or any combination thereof. The capability report may be transmitted from receiving device 715 using LPP message(s). In some embodiments, the non-uniform RS configuration may be determined based on the capability report received from receiving device 715. Accordingly, unlike the existing RS configurations which are configured in a cell-specific manner, the non-uniform RS configuration disclosed herein may be configured in a receiving device-specific manner (e.g., customized according to the capability/preference of the receiving device).

Figure 8:
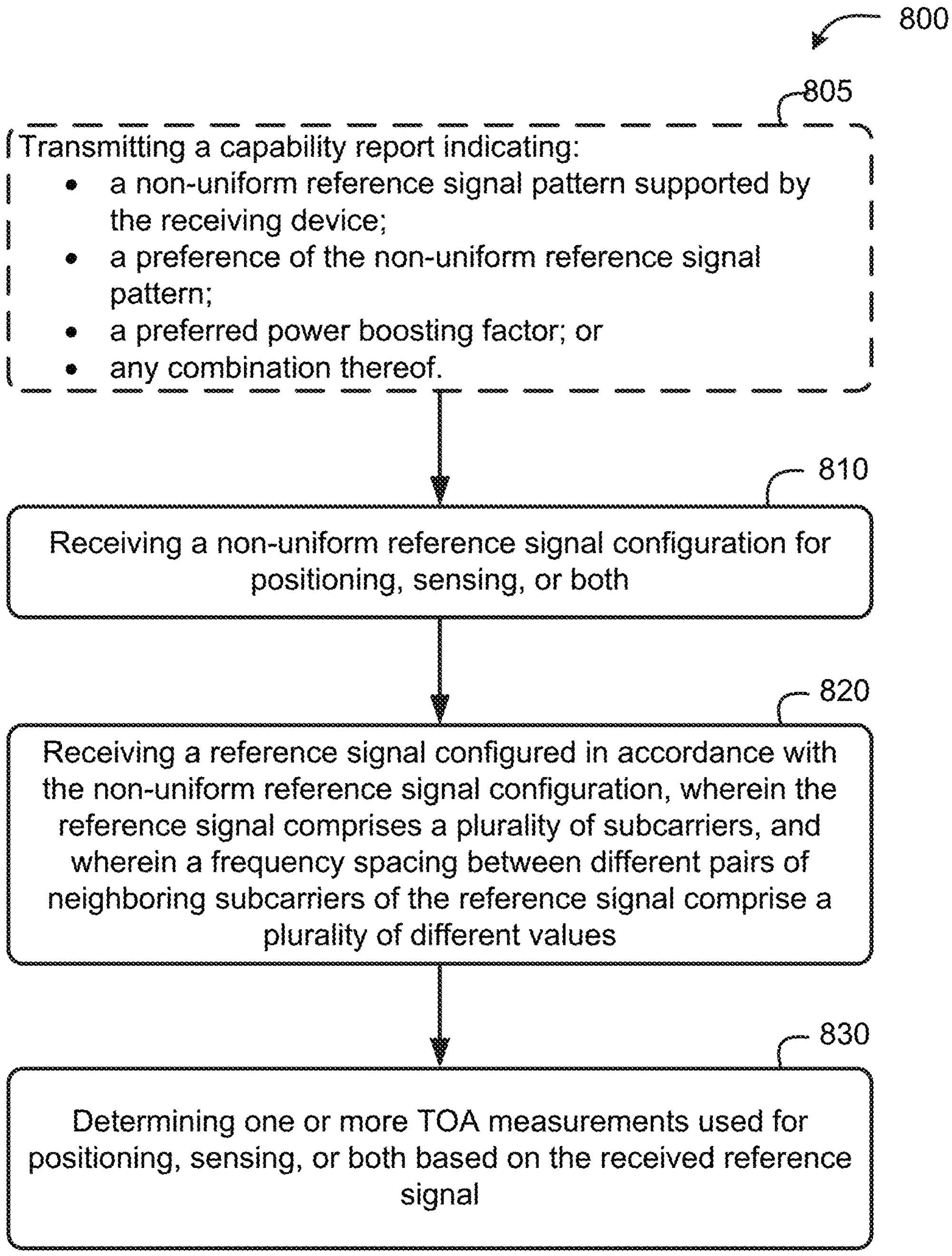
FIG. 8 is a flow diagram of a method of radio frequency sensing for sensing a target device performed by the target device using non-uniform patterned RSs, according to embodiments disclosed herein.

FIG. 8 is a flow diagram of a method 800 of RF positioning, sensing, or both performed by a receiving device using non-uniform patterned RSs, according to embodiments disclosed herein. Means/structure for performing the functionality illustrated in one or more of the blocks shown in FIG. 8 may be performed by hardware and/or software components of a receiving device (e.g., a UE), as described herein. Example components of a UE that can act as the receiving device are illustrated in FIG. 10, which is described in more detail below.

At block 810, the functionality comprises receiving a non-uniform reference signal configuration for positioning, sensing, or both. In some embodiments, the non-uniform RS configuration may include a parameter associated with the non-uniform sequence pattern (e.g., the type of the non-uniform sequence pattern, a sequence order of the non-uniform sequence pattern, RE-level offset (for multiplexing), time-staggering pattern), a power boosting factor of the reference signal, or any combination thereof.

Figure 10:
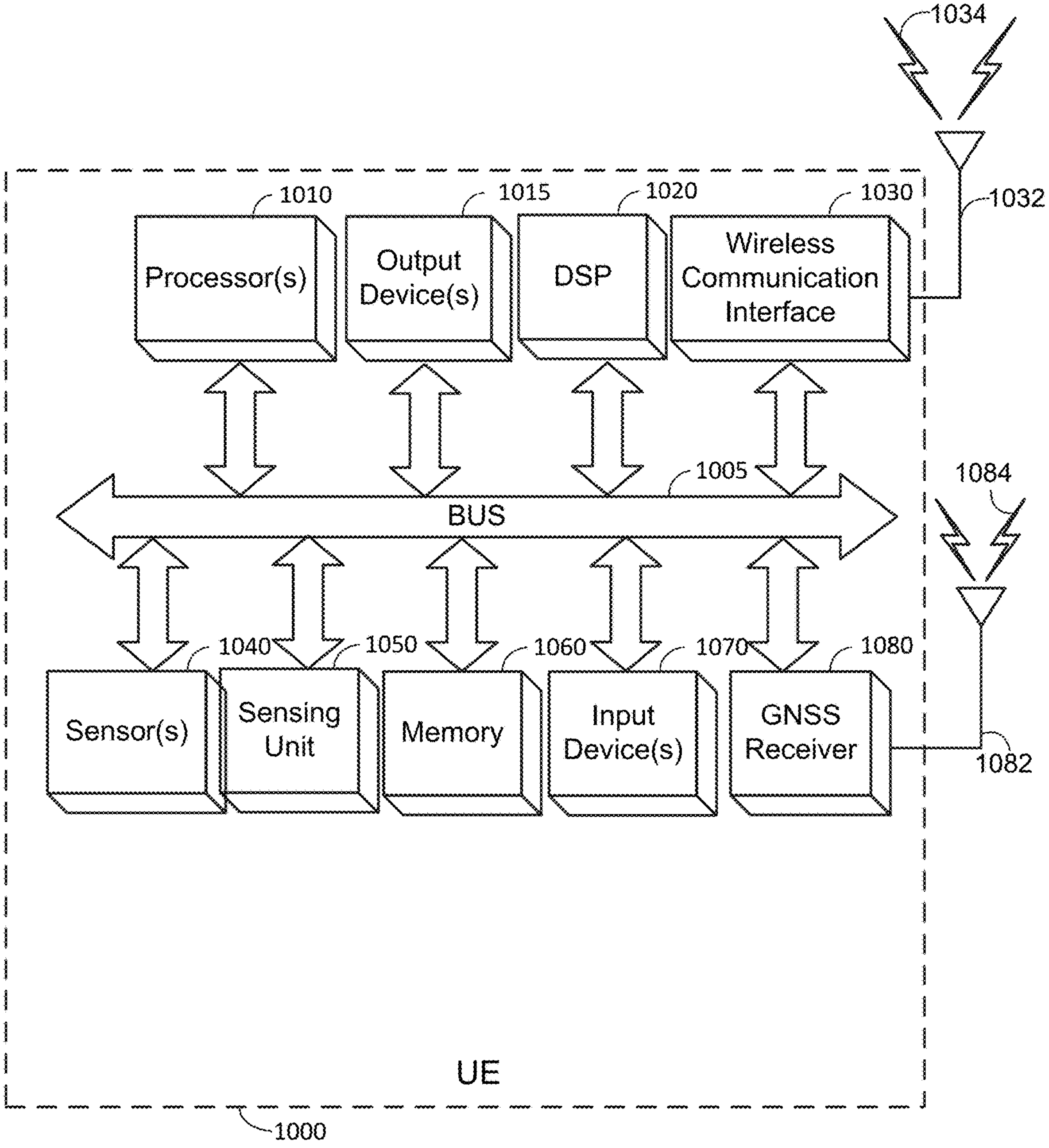
FIG. 10 is a block diagram of an embodiment of a UE.

Means for performing functionality at block 810 may comprise a bus 1005, processor(s) 1010, wireless communications interface 1030, memory 1060, and/or other components of a wireless device 1000, as illustrated in FIG. 10.

At block 820, the functionality comprises receiving a RS configured in accordance with the non-uniform reference signal configuration, wherein the RS comprises a plurality of subcarriers, and wherein a frequency spacing between different pairs of neighboring subcarriers of the reference signal comprises a plurality of different values (e.g., configured as a non-uniform patterned RS). In some embodiments, according to the non-uniform reference signal configuration, a frequency spacing between different pairs of neighboring and non-neighboring subcarriers of the reference signal comprises a set of contiguous integer numbers. As discussed above, the non-uniform patterned RSs may be configured according to the non-uniform RS pattern discussed with regard to FIGS. 5 and 6 (e.g., the plurality of subcarriers of the non-uniform patterned RSs may be configured according to a non-uniform sequence pattern determined based on: a minimum hole sequence, a minimum redundancy sequence, a nested sequence, or any combination thereof, and may be staggered (e.g., across multiple symbols in a case where the non-uniform patterned RS includes multiple symbols) or de-staggered (e.g., in a case where the non-uniform patterned RS includes one symbol)).

Means for performing functionality at block 820 may comprise a bus 1005, processor(s) 1010, wireless communications interface 1030, memory 1060, and/or other components of a wireless device 1000, as illustrated in FIG. 10.

At block 830, the functionality comprises determining one or more TOA measurements used for positioning, sensing, or both based on the received reference signal (e.g., using multiple signal classification (MUSIC) algorithm). In some embodiments, when sensing and/or positioning the receiving device, the position of the receiving device may be determined based on TOA measurements determined using a covariance matrix of the RSs received by the receiving device. Additionally or alternatively, in some embodiments, when RF sensing a target, the detection of the target (including their location and speed) may be determined based on TOA measurements determined using a covariance matrix of a reflection of the non-uniform patterned RSs, reflected by the target and received by the receiving device. Means for performing functionality at block 830 may comprise a bus 1005, processor(s) 1010, wireless communications interface 1030, memory 1060, and/or other components of a wireless device 1000, as illustrated in FIG. 10. It is noted that the covariance matrix-based method discussed here are for illustrative purposes only. Any other suitable sensing and/or positioning method (e.g., matrix pencil) may also apply.

In some embodiments, method 800 may also include power boosting the plurality of subcarriers of the non-uniform patterned RSs. In some embodiments, method 800 may also include multiplexing a plurality of the non-uniform patterned RSs disclosed herein.

As noted above, using the non-uniform patterned RSs disclosed herein for RF sensing and/or positioning may have a higher TOA resolution when a same number of subcarriers are used, higher power boosting factor for each subcarrier used, and may allow a larger number of RSs multiplexing compared with using existing uniform patterned RSs.

In some embodiments, prior to block 810, method 800 may optionally include block 805, the functionality of which comprises transmitting a capability report to the server (e.g., server 705 in FIG. 7) and/or wireless network node (e.g., wireless network node 710 in FIG. 7). As noted above, the capability report may include a non-uniform RS pattern supported by the receiving device, a preference of the non-uniform reference signal pattern, a preferred power boosting factor, or any combination thereof. The capability report may be transmitted from the receiving device using LPP message(s). In some embodiments, the non-uniform RS configuration may be determined based on the capability report received from the receiving device. Accordingly, unlike the existing RS configurations which are configured in a cell-specific manner, the non-uniform RS configuration disclosed herein may be configured in a receiving device-specific manner (e.g., customized according to the capability/preference of the receiving device).

Means for performing functionality at block 805 may comprise a bus 1005, processor(s) 1010, wireless communications interface 1030, memory 1060, and/or other components of a wireless device 1000, as illustrated in FIG. 10.

Figure 9:
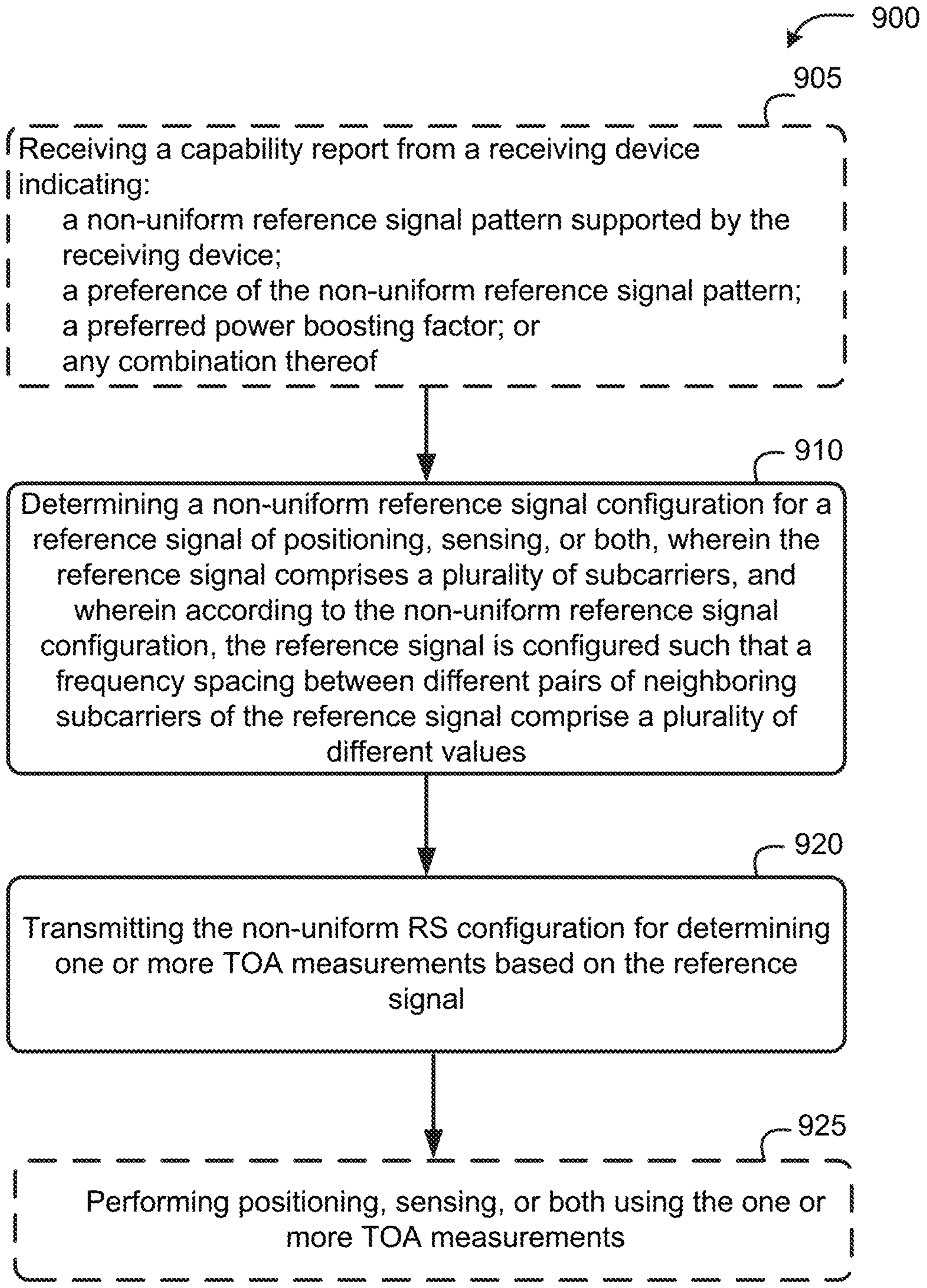
FIG. 9 is a flow diagram of a method of radio frequency sensing for sensing a target device performed by a server, according to some embodiments.
Figure 11:
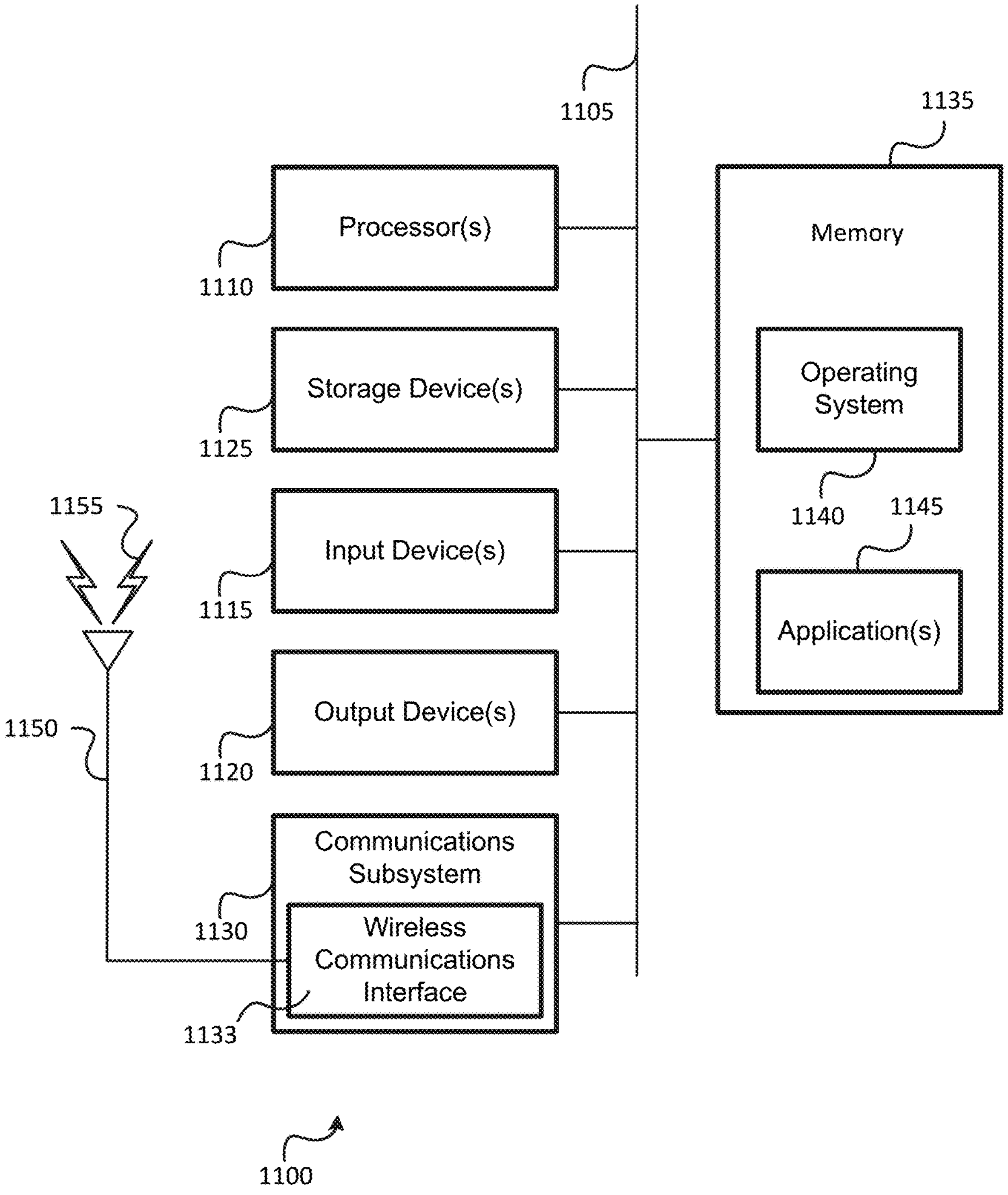
FIG. 11 is a block diagram of an embodiment of a computer system.

FIG. 9 is a flow diagram of a method 900 of positioning, sensing, or both performed by a server, according to some embodiments. Means/structure for performing the functionality illustrated in one or more of the blocks shown in FIG. 9 may be performed by hardware and/or software components of a server (e.g., an Operations and Maintenance (O&M) server, a location server, and/or a SMF) as described herein. Example components of a computer system that can be used as a server are illustrated in FIG. 11, which is described in more detail below. In some embodiments, the receiving device (e.g., a UE) may originate a request for determining the position of the receiving device (e.g., from an application, or "app," executed by the receiving device), and the positioning and/or sensing may be UE-based. In some other embodiments, the server and/or an external client (e.g., external client 230) may originate the request, and the positioning and/or sensing may be UE-assisted (or "network-based").

At block 910, the functionality comprises, determining a non-uniform reference signal configuration for a reference signal of positioning, sensing, or both, wherein the reference signal comprises a plurality of subcarriers, and wherein according to the non-uniform reference signal configuration, the reference signal is configured such that a frequency spacing between different pairs of neighboring subcarriers of the reference signal comprises a plurality of different values. In some embodiments, according to the non-uniform reference signal configuration, a frequency spacing between different pairs of neighboring and non-neighboring subcarriers of the reference signal comprises a set of contiguous integer numbers. In some embodiments, the non-uniform RS configuration may include a parameter associated with the non-uniform sequence pattern (e.g., the type of the non-uniform sequence pattern, a sequence order of the non-uniform sequence pattern, RE-level offset (for multiplexing), time-staggering pattern), a power boosting factor of the reference signal, or any combination thereof. As discussed above, the non-uniform patterned RSs may be configured according to the non-uniform RS pattern discussed with regard to FIGS. 5 and 6 (e.g., the plurality of subcarriers of the non-uniform patterned RSs may be configured according to a non-uniform sequence pattern determined based on: a minimum hole sequence, a minimum redundancy sequence, a nested sequence, or any combination thereof, and may be staggered (e.g., across multiple symbols in a case where the non-uniform patterned RS includes multiple symbols) or de-staggered (e.g., in a case where the non-uniform patterned RS includes one symbol)).

Means for performing functionality at block 910 may comprise a bus 1105, processor(s) 1110, storage device(s) 1125, communications subsystem 1130, memory 1135 (e.g., including operating system 1140 and application(s) 1145), and/or other components of a computing system 1100, as illustrated in FIG. 11.

At block 920, the functionality comprises transmitting the non-uniform RS configuration for determining one or more TOA measurements based on the reference signal. For example, the server may transmit the non-uniform RS configuration to a wireless network node (e.g., wireless network node 710 in FIG. 7) and a receiving device (e.g., receiving device 715 in FIG. 7) directly, or the server may transmit the non-uniform RS configuration to the wireless network node which may relay the non-uniform RS configuration to the receiving device.

Means for performing functionality at block 920 may comprise a bus 1105, processor(s) 1110, storage device(s) 1125, communications subsystem 1130, memory 1135 (e.g., including operating system 1140 and application(s) 1145), and/or other components of a computing system 1100, as illustrated in FIG. 11.

In some embodiments, the plurality of the subcarriers of the non-uniform RSs may be power boosted. In some embodiments, the non-uniform patterned RSs disclosed herein may be multiplexed.

In some embodiments, prior to block 910, method 900 may optionally include block 905, the functionality of which comprises receiving a capability report from the receiving device. As noted above, the capability report may include a non-uniform RS pattern supported by the receiving device, a preference of the non-uniform reference signal pattern, a preferred power boosting factor, or any combination thereof. The capability report may be transmitted from the receiving device using LPP message(s). In some embodiments, the non-uniform RS configuration may be determined based on the capability report received from the receiving device. Accordingly, unlike the existing RS configurations which are configured in a cell-specific manner, the non-uniform RS configuration disclosed herein may be configured in a receiving device-specific manner (e.g., customized according to the capability/preference of the receiving device).

Means for performing functionality at block 905 may comprise a bus 1105, processor(s) 1110, storage device(s) 1125, communications subsystem 1130, memory 1135 (e.g., including operating system 1140 and application(s) 1145), and/or other components of a computing system 1100, as illustrated in FIG. 11.

In some embodiments, method 900 may optionally include block 925, the functionality of which comprises performing positioning, sensing, or both using the one or more TOA measurements.

Means for performing functionality at block 925 may comprise a bus 1105, processor(s) 1110, storage device(s) 1125, communications subsystem 1130, memory 1135 (e.g., including operating system 1140 and application(s) 1145), and/or other components of a computing system 1100, as illustrated in FIG. 11.

FIG. 10 is a block diagram of an embodiment of a UE 1000, which can be utilized as described herein (e.g., in association with the previously described figures). In some embodiments, for example, the UE 1000 may comprise, for example, a mobile (e.g., movable/portable) device (e.g., tablet, laptop, vehicle, etc.). It should be noted that FIG. 10 is meant only to provide a generalized illustration of various components, any or all of which may be utilized as appropriate.

The UE 1000 is shown comprising hardware elements that can be electrically coupled via a bus 1005 (or may otherwise be in communication, as appropriate). The hardware elements may include a processor(s) 1010 which can include without limitation one or more general-purpose processors (e.g., an application processor), one or more special-purpose processors (such as digital signal processor (DSP) chips, graphics acceleration processors, application specific integrated circuits (ASICs), and/or the like), and/or other processing structures or means. Processor(s) 1010 may comprise one or more processing units, which may be housed in a single integrated circuit (IC) or multiple ICs. As shown in FIG. 10, some embodiments may have a separate DSP 1020, depending on desired functionality. Location determination and/or other determinations based on wireless communication may be provided in the processor(s) 1010 and/or wireless communication interface 1030 (discussed below). The UE 1000 also can include one or more input devices 1070, which can include without limitation one or more keyboards, touch screens, touch pads, microphones, buttons, dials, switches, and/or the like; and one or more output devices 1015, which can include without limitation one or more displays (e.g., touch screens), light emitting diodes (LEDs), speakers, and/or the like.

The UE 1000 may also include a wireless communication interface 1030, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, a WAN device, and/or various cellular devices, etc.), and/or the like, which may enable the UE 1000 to communicate with other devices as described in the embodiments above. The wireless communication interface 1030 may permit data and signaling to be communicated (e.g., transmitted and received) with base stations of a network, for example, via eNBs, gNBs, ng-eNBs, access points, various base stations and/or other access node types, and/or other network components, computer systems, and/or any other electronic devices communicatively coupled with base stations, as described herein. The communication can be carried out via one or more wireless communication antenna(s) 1032 that send and/or receive wireless signals 1034. According to some embodiments, the wireless communication antenna(s) 1032 may comprise a plurality of discrete antennas, antenna arrays, or any combination thereof. The antenna(s) 1032 may be capable of transmitting and receiving wireless signals using beams (e.g., Tx beams and Rx beams). Beam formation may be performed using digital and/or analog beam formation techniques, with respective digital and/or analog circuitry. The wireless communication interface 1030 may include such circuitry.

Depending on desired functionality, the wireless communication interface 1030 may comprise a separate receiver and transmitter, or any combination of transceivers, transmitters, and/or receivers to communicate with base stations (e.g., ng-eNBs and gNBs) and other terrestrial transceivers, such as wireless devices and access points. The UE 1000 may communicate with different data networks that may comprise various network types. For example, one such network type may comprise a wireless wide area network (WWAN), which may be a code-division multiple access (CDMA) network, a time division multiple access (TDMA) network, a frequency division multiple access (FDMA) network, an orthogonal frequency division multiple access (OFDMA) network, a single-carrier frequency division multiple access (SC-FDMA) network, a WiMAX (IEEE 802.16) network, and so on. A CDMA network may implement one or more radio access technologies (RATs) such as CDMA2000®, wideband code division multiple access (WCDMA), and so on. CDMA2000® includes IS-95, IS-2000 and/or IS-856 standards. A TDMA network may implement global system for mobile communications (GSM), digital advanced mobile phone system (D-AMPS), or some other RAT. An OFDMA network may employ long-term evolution (LTE), LTE Advanced, fifth-generation (5G) new radio (NR), and so on. 5G NR, LTE, LTE Advanced, GSM, and WCDMA are described in documents from 3rd Generation Partnership Project (3GPP). CDMA2000® is described in documents from a consortium named "3rd Generation Partnership Project 2" (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The UE 1000 can further include sensor(s) 1040. Sensor(s) 1040 may comprise, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), and the like), some of which may be used to obtain position-related measurements and/or other information.

Embodiments of the UE 1000 may further comprise a sensing unit 1050. The sensing unit 1050 may comprise hardware and/or software components capable of transmitting and/or receiving RF signals (e.g., RS) to detect one or more targets in the manner described herein. The sensing unit 1050 may comprise a standalone component connected with a bus 1005, as illustrated, or may be incorporated into another component (e.g., the wireless communication interface 1030). Further, the sensing unit 1050 may be communicatively coupled with an antenna 1032, which it may share with the wireless communication interface 1030. Additionally or alternatively, the sensing unit 1050 may have its own antenna (not shown). In some embodiments the sensing unit 1050 may be communicatively coupled with multiple antennas or an antenna array capable of sending and/or receiving RF signals via directional beams.

Embodiments of the UE 1000 may also include a Global Navigation Satellite System (GNSS) receiver 1080 capable of receiving signals 1084 from one or more GNSS satellites using an antenna 1082 (which could be the same as antenna 1032). Positioning based on GNSS signal measurement can be utilized to complement and/or incorporate the techniques described herein. The GNSS receiver 1080 can extract a position of the UE 1000, using conventional techniques, from GNSS satellites of a GNSS system, such as Global Positioning System (GPS), Galileo, GLONASS, Quasi-Zenith Satellite System (QZSS) over Japan, IRNSS over India, BeiDou Navigation Satellite System (BDS) over China, and/or the like. Moreover, the GNSS receiver 1080 can be used with various augmentation systems (e.g., a Satellite Based Augmentation System (SBAS)) that may be associated with or otherwise enabled for use with one or more global and/or regional navigation satellite systems, such as, e.g., Wide Area Augmentation System (WAAS), European Geostationary Navigation Overlay Service (EGNOS), Multi-functional Satellite Augmentation System (MSAS), and Geo Augmented Navigation system (GAGAN), and/or the like.

It can be noted that, although GNSS receiver 1080 is illustrated in FIG. 10 as a distinct component, embodiments are not so limited. As used herein, the term "GNSS receiver" may comprise hardware and/or software components configured to obtain GNSS measurements (measurements from GNSS satellites). In some embodiments, therefore, the GNSS receiver may comprise a measurement engine executed (as software) by one or more processors, such as processor(s) 1010, DSP 1020, and/or a processor within the wireless communication interface 1030 (e.g., in a modem). A GNSS receiver may optionally also include a positioning engine, which can use GNSS measurements from the measurement engine to determine a position of the GNSS receiver using an Extended Kalman Filter (EKF), Weighted Least Squares (WLS), particle filter, or the like. The positioning engine may also be executed by one or more processors, such as processor(s) 1010 or DSP 1020.

The UE 1000 may further include and/or be in communication with a memory 1060. The memory 1060 can include, without limitation, local and/or network accessible storage, a disk drive, a drive array, an optical storage device, a solid-state storage device, such as a random-access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 1060 of the UE 1000 also can comprise software elements (not shown in FIG. 10), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1060 that are executable by the UE 1000 (and/or processor(s) 1010 or DSP 1020 within UE 1000). In some embodiments, then, such code and/or instructions can be used to configure and/or adapt a general-purpose computer (or other device) to perform one or more operations in accordance with the described methods.

FIG. 11 is a block diagram of an embodiment of a computer system 1100, which may be used, in whole or in part, to provide the functions of one or more components and/or devices as described in the embodiments herein, including a server (e.g., sensing server/SMF, location server/LMF, etc.) in communication with one or more base stations and/or one or more sensing nodes to coordinate RF sensing as described in embodiments herein. This may include, for example, a computer server, personal computer, personal electronic device, or the like. It should be noted that FIG. 11 is meant only to provide a generalized illustration of various components, any or all of which may be utilized as appropriate. FIG. 11, therefore, broadly illustrates how individual system elements may be implemented in a relatively separated or relatively more integrated manner. In addition, it can be noted that components illustrated by FIG. 11 can be localized to a single device and/or distributed among various networked devices, which may be disposed at different geographical locations.

The computer system 1100 is shown comprising hardware elements that can be electrically coupled via a bus 1105 (or may otherwise be in communication, as appropriate). The hardware elements may include processor(s) 1110, which may comprise without limitation one or more general-purpose processors, one or more special-purpose processors (such as digital signal processing chips, graphics acceleration processors, and/or the like), and/or other processing structure, which can be configured to perform one or more of the methods described herein. The computer system 1100 also may comprise one or more input devices 1115, which may comprise without limitation a mouse, a keyboard, a camera, a microphone, and/or the like; and one or more output devices 1120, which may comprise without limitation a display device, a printer, and/or the like.

The computer system 1100 may further include (and/or be in communication with) one or more non-transitory storage devices 1125, which can comprise, without limitation, local and/or network accessible storage, and/or may comprise, without limitation, a disk drive, a drive array, an optical storage device, a solid-state storage device, such as a random-access memory (RAM) and/or read-only memory (ROM), which can be programmable, flash-updateable, and/or the like. Such storage devices may be configured to implement any appropriate data stores, including without limitation, various file systems, database structures, and/or the like. Such data stores may include database(s) and/or other data structures used store and administer messages and/or other information to be sent to one or more devices via hubs, as described herein.

The computer system 1100 may also include a communications subsystem 1130, which may comprise wireless communication technologies managed and controlled by a wireless communication interface 1133, as well as wired technologies (such as Ethernet, coaxial communications, universal serial bus (USB), and the like). The wireless communication interface 1133 may comprise one or more wireless transceivers that may send and receive wireless signals 1155 (e.g., signals according to 5G NR or LTE) via wireless antenna(s) 1150. Thus the communications subsystem 1130 may comprise a modem, a network card (wireless or wired), an infrared communication device, a wireless communication device, and/or a chipset, and/or the like, which may enable the computer system 1100 to communicate on any or all of the communication networks described herein to any device on the respective network, including a User Equipment (UE), base stations and/or other transmission reception points (TRPs), and/or any other electronic devices described herein. Hence, the communications subsystem 1130 may be used to receive and send data as described in the embodiments herein.

In many embodiments, the computer system 1100 will further comprise a working memory 1135, which may comprise a RAM or ROM device, as described above. Software elements, shown as being located within the working memory 1135, may comprise an operating system 1140, device drivers, executable libraries, and/or other code, such as one or more applications 1145, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 1125 described above. In some cases, the storage medium might be incorporated within a computer system, such as computer system 1100. In other embodiments, the storage medium might be separate from a computer system (e.g., a removable medium, such as an optical disc), and/or provided in an installation package, such that the storage medium can be used to program, configure, and/or adapt a general-purpose computer with the instructions/code stored thereon. These instructions might take the form of executable code, which is executable by the computer system 1100 and/or might take the form of source and/or installable code, which, upon compilation and/or installation on the computer system 1100 (e.g., using any of a variety of generally available compilers, installation programs, compression/decompression utilities, etc.), then takes the form of executable code.

Figure 12:
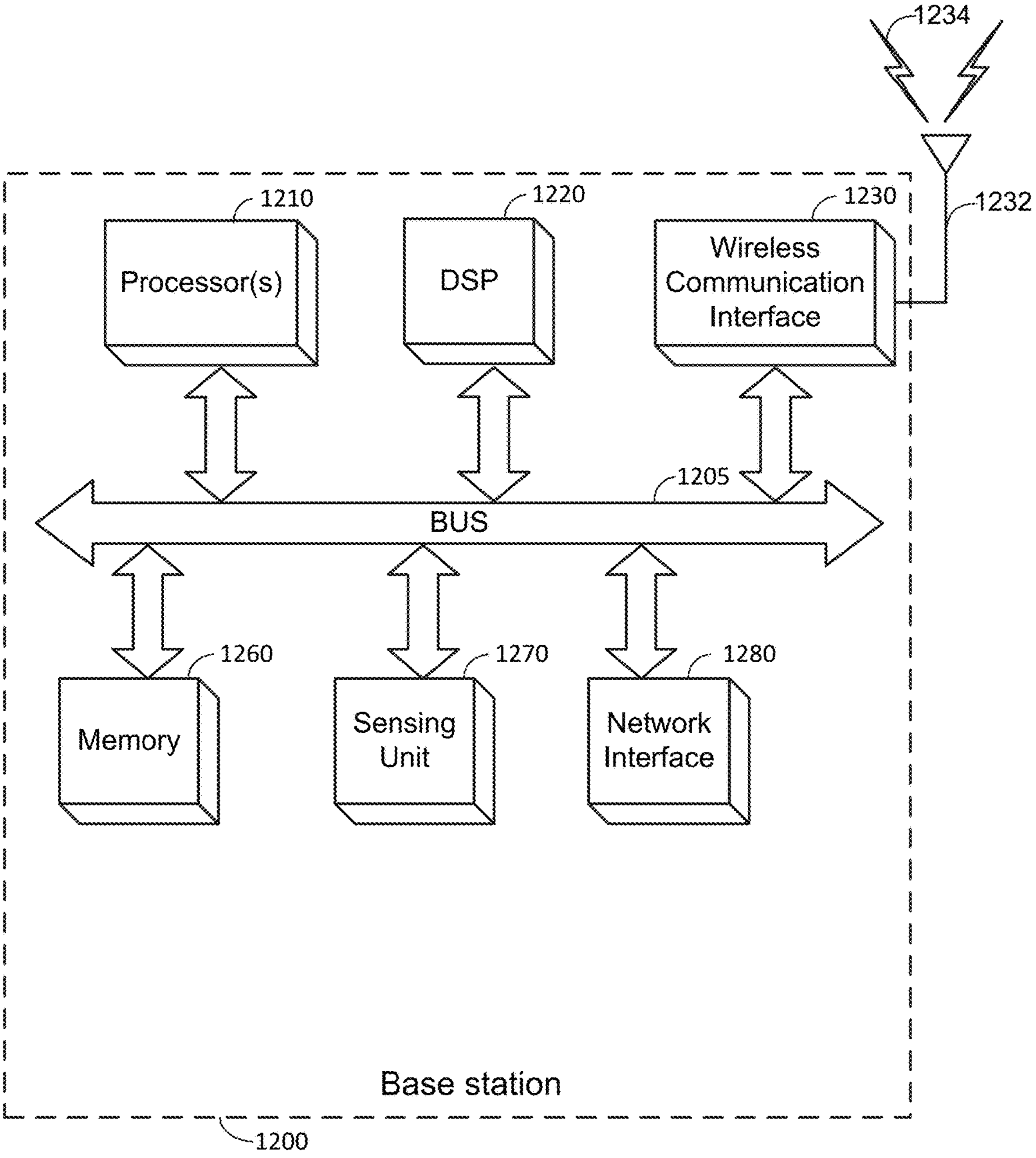
FIG. 12 is a block diagram of an embodiment of a base station.

FIG. 12 is a block diagram of an embodiment of a base station 1200, which can be utilized as described herein above, with respect to base stations and/or Transmission Reception Point (TRPs). It should be noted that FIG. 12 is meant only to provide a generalized illustration of various components, any or all of which may be utilized as appropriate. In some embodiments, the base station 1200 may correspond to a gNB, an ng-eNB, and/or (more generally) a TRP. In some cases, a base station 1200 may comprise multiple TRPs—e.g., with each TRP associated with a different antenna or a different antenna array of the base station 1200 (e.g., 1232). As used herein, the transmission functionality of a TRP may be performed with a transmission point (TP) and/or the reception functionality of a TRP may be performed by a reception point (RP), which may be physically separate or distinct from a TP. That said, a TRP may comprise both a TP and an RP.

The functionality performed by a base station 1200 in earlier-generation networks (e.g., 3G and 4G) may be separated into different functional components (e.g., radio units (RUs), distributed units (DUs), and central units (CUs)) and layers (e.g., L1/L2/L3) in view Open Radio Access Networks (O-RAN) and/or Virtualized Radio Access Network (V-RAN or vRAN) in 5G or later networks, which may be executed on different devices at different locations connected, for example, via fronthaul, midhaul, and backhaul connections. As referred to herein, a "base station" (or ng-eNB, gNB, etc.) may include any or all of these functional components. The functionality of these functional components may be performed by one or more of the hardware and/or software components illustrated in FIG. 12.

The base station 1200 is shown comprising hardware elements that can be electrically coupled via a bus 1205 (or may otherwise be in communication, as appropriate). The hardware elements may include a processor(s) 1210 which can include without limitation one or more general-purpose processors, one or more special-purpose processors (such as digital signal processor (DSP) chips, graphics acceleration processors, application-specific integrated circuits (ASICs), and/or the like), and/or other processing structure or means. As shown in FIG. 12, some embodiments may have a separate DSP 1220, depending on desired functionality. Location determination and/or other determinations based on wireless communication may be provided in the processor(s) 1210 and/or wireless communication interface 1230 (discussed below), according to some embodiments. The base station 1200 also can include one or more input devices, which can include without limitation a keyboard, display, mouse, microphone, button(s), dial(s), switch(es), and/or the like; and one or more output devices, which can include without limitation a display, light emitting diode (LED), speakers, and/or the like.

The base station 1200 might also include a wireless communication interface 1230, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, cellular communication facilities, etc.), and/or the like, which may enable the base station 1200 to communicate as described herein. The wireless communication interface 1230 may permit data and signaling to be communicated (e.g., transmitted and received) to UEs, other base stations/TRPs (e.g., eNBs, gNBs, and ng-eNBs), and/or other network components, computer systems, and/or other electronic devices described herein. The communication can be carried out via one or more wireless communication antenna(s) 1232 that send and/or receive wireless signals 1234. According to some embodiments, one or more wireless communication antenna(s) 1232 may comprise one or more antenna arrays, which may be capable of beamforming.

Embodiments of the base station 1200 may further comprise a sensing unit 1270. The sensing unit 1270 may comprise hardware and/or software components capable of transmitting and/or receiving RF signals (e.g., RS) to detect one or more targets in the manner described herein. The sensing unit 1270 may comprise a standalone component connected with a bus 1205, as illustrated, or may be incorporated into another component (e.g., the wireless communication interface 1230). Further, the sensing unit 1270 may be communicatively coupled with an antenna 1232, which it may share with the wireless communication interface 1230. Additionally or alternatively, the sensing unit 1270 may have its own antenna (not shown). In some embodiments the sensing unit 1270 may be communicatively coupled with multiple antennas or an antenna array capable of sending and/or receiving RF signals via directional beams.

The base station 1200 may also include a network interface 1280, which can include support of wireline communication technologies. The network interface 1280 may include a modem, network card, chipset, and/or the like. The network interface 1280 may include one or more input and/or output communication interfaces to permit data to be exchanged with a network, communication network servers, computer systems, and/or any other electronic devices described herein.

In many embodiments, the base station 1200 may further comprise a memory 1260. The memory 1260 can include, without limitation, local and/or network accessible storage, a disk drive, a drive array, an optical storage device, a solid-state storage device, such as a random-access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 1260 of the base station 1200 also may comprise software elements (not shown in FIG. 12), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1260 that are executable by the base station 1200 (and/or processor(s) 1210 or DSP 1220 within base station 1200). In some embodiments, then, such code and/or instructions can be used to configure and/or adapt a general-purpose computer (or other device) to perform one or more operations in accordance with the described methods.

It will be apparent to those skilled in the art that substantial variations may be made in accordance with specific requirements. For example, customized hardware might also be used and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processors and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media and volatile media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussion utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the scope of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description embodiments may include different combinations of features. Implementation examples are described in the following numbered clauses:

Clause 1. A method of positioning, sensing, or both performed by a receiving device, the method may comprise receiving a non-uniform reference signal configuration for positioning, sensing, or both; receiving a reference signal configured in accordance with the non-uniform reference signal configuration, wherein the reference signal comprises a plurality of subcarriers, and wherein a frequency spacing between different pairs of neighboring subcarriers of the reference signal comprises a plurality of different values; and determining one or more TOA measurements used for positioning, sensing, or both based on the received reference signal.

Clause 2. The method of the clause 1, wherein the plurality of subcarriers of the reference signal is configured according to a non-uniform sequence pattern determined based on: a minimum hole sequence; a minimum redundancy sequence; a nested sequence; or any combination thereof.

Clause 3. The method of any of clause 1 or 2, wherein the first, the second, and the third time points are selected from a predetermined time window.

Clause 4. The method of any of clauses 1-3, wherein the non-uniform reference signal configuration is determined based on a capability report transmitted by the receiving device, and wherein the method further comprises: prior to receiving the non-uniform reference signal configuration, transmitting the capability report indicating: a non-uniform reference signal pattern supported by the receiving device; a preference of the non-uniform reference signal pattern; a preferred power boosting factor; or any combination thereof.

Clause 5. The method of any of clauses 1-4, wherein the capability report is indicated in a LTE positioning protocol (LPP) message.

Clause 6. The method of any of clauses 1-5, wherein the non-uniform reference signal configuration indicates: a parameter associated with the non-uniform sequence pattern; a power boosting factor of the plurality of subcarriers of the reference signal; or any combination thereof.

Clause 7. The method of any of clauses 1-6, wherein the reference signal comprises a plurality of symbols, and wherein the plurality of subcarriers of the reference signal are spread across the plurality of symbols.

Clause 8. The method of any of clauses 1-7, further comprising: multiplexing another reference signal configured in accordance with the non-uniform reference signal configuration.

Clause 9. The method of any of clauses 1-8, further comprising: receiving a reflection of the reference signal reflected by a target; and positioning, sensing, or both the target based on the reflection of the reference signal.

Clause 10. The method of any of clauses 1-9, further comprising: positioning, sensing, or both the receiving device based on the one or more TOA measurements.

Clause 11. The method of any of clauses 1-10, wherein a frequency spacing between different pairs of neighboring and non-neighboring subcarriers of the reference signal comprises a set of contiguous integer numbers.

Clause 12. A method of positioning, sensing, or both performed by a server, the method may comprise: determining a non-uniform reference signal configuration for a reference signal of positioning, sensing, or both, wherein the reference signal comprises a plurality of subcarriers, and wherein according to the non-uniform reference signal configuration, the reference signal is configured such that a frequency spacing between different pairs of neighboring subcarriers of the reference signal comprises a plurality of different values; and transmitting the non-uniform reference signal configuration for determining one or more TOA measurements based on the reference signal.

Clause 13. The method of the clause 12, wherein the plurality of subcarriers of the reference signal is configured according to a non-uniform sequence pattern determined based on: a minimum hole sequence; a minimum redundancy sequence; a nested sequence; or any combination thereof.

Clause 14. The method of any of clause 12 or 13, wherein the plurality of subcarriers of the reference signal is power boosted.

Clause 15. The method of any of clauses 12-14, wherein the method further comprises: prior to determining the non-uniform reference signal configuration, receiving from a receiving device, a capability report indicating: a non-uniform reference signal pattern supported by the receiving device; a preference of the non-uniform reference signal pattern; a preferred power boosting factor; or any combination thereof, and wherein the non-uniform reference signal configuration is determined based on the capability report.

Clause 16. The method of any of clauses 12-15, wherein the capability report is indicated in a LTE positioning protocol (LPP) message.

Clause 17. The method of any of clauses 12-16, wherein the non-uniform reference signal configuration indicates: a parameter associated with the non-uniform sequence pattern; a power boosting factor of the plurality of subcarriers of the reference signal; or any combination thereof.

Clause 18. The method of any of clauses 12-17, wherein the reference signal comprises a plurality of symbols, and wherein the plurality of subcarriers of the reference signal are spread across the plurality of symbols.

Clause 19. The method of any of clauses 12-18, wherein a frequency spacing between different pairs of neighboring and non-neighboring subcarriers of the reference signal comprises a set of contiguous integer numbers.

Clause 20. The method of any of clauses 12-19, further comprising performing positioning, sensing, or both using the one or more TOA measurements.

Clause 21. A device for positioning, sensing, or both performed, the device may comprise: a transceiver; a memory; and one or more processors communicatively coupled with the transceiver and the memory. The one or more processors may be configured to: receive a non-uniform reference signal configuration for positioning, sensing, or both; receive a reference signal configured in accordance with the non-uniform reference signal configuration, wherein the reference signal comprises a plurality of subcarriers, and wherein a frequency spacing between different pairs of neighboring subcarriers of the reference signal comprises a plurality of different values; and determine one or more TOA measurements used for positioning, sensing, or both based on the received reference signal.

Clause 22. The device of clause 21, wherein the plurality of subcarriers of the reference signal is configured according to a non-uniform sequence pattern determined based on: a minimum hole sequence; a minimum redundancy sequence; a nested sequence; or any combination thereof.

Clause 23. The device of any of clause 21 or 22, wherein the plurality of subcarriers of the reference signal is power boosted.

Clause 24. The device of any of clauses 20-22, wherein the non-uniform reference signal configuration is determined based on a capability report transmitted by the device, and wherein the one or more processors are further configured to: prior to receiving the non-uniform reference signal configuration, transmit the capability report indicating: a non-uniform reference signal pattern supported by the device; a preference of the non-uniform reference signal pattern; a preferred power boosting factor; or any combination thereof.

Clause 25. The device of any of clauses 21-24, wherein the capability report is indicated in a LTE positioning protocol (LPP) message.

Clause 26. The device of any of clauses 20-24, wherein the non-uniform reference signal configuration indicates: a parameter associated with the non-uniform sequence pattern; a power boosting factor of the plurality of subcarriers of the reference signal; or any combination thereof.

Clause 27. The device of any of clauses 21-26, wherein the reference signal comprises a plurality of symbols, and wherein the plurality of subcarriers of the reference signal are spread across the plurality of symbols.

Clause 28. The device of any of clauses 21-27, wherein the one or more processors are further configured to: multiplex another reference signal configured in accordance with the non-uniform reference signal configuration.

Clause 29. The device of any of clauses 21-28, wherein the one or more processors are further configured to: receive a reflection of the reference signal reflected by a target; and position the target based on the reflection of the reference signal.

Clause 30. The device of any of clauses 21-29, wherein the one or more processors are further configured to: position the device based on the one or more TOA measurements.

Clause 31. An example server for positioning, sensing, or both performed, the server may comprise: a transceiver; a memory; and one or more processors communicatively coupled with the transceiver and the memory. The one or more processors may be configured to: determine a non-uniform reference signal configuration for a reference signal of positioning, sensing, or both, wherein the reference signal comprises a plurality of subcarriers, and wherein according to the non-uniform reference signal configuration, the reference signal is configured such that a frequency spacing between different pairs of neighboring subcarriers of the reference signal comprises a plurality of different values; and transmit the non-uniform reference signal configuration for determining one or more TOA measurements based on the reference signal.

Clause 32. The server of clause 31, wherein the one or more processors are further configured to: perform positioning, sensing, or both using the one or more TOA measurements.

What is claimed is:

1. A method of positioning, sensing, or both performed by a receiving device, the method comprising:
- receiving a non-uniform reference signal configuration for positioning, sensing, or both;
- receiving a reference signal configured in accordance with the non-uniform reference signal configuration, wherein the reference signal comprises a plurality of subcarriers, and wherein a frequency spacing between different pairs of neighboring subcarriers of the reference signal comprises a plurality of different values; and
- determining one or more time of arrival (TOA) measurements used for positioning, sensing, or both based on the received reference signal.

2. The method of claim 1, wherein the plurality of subcarriers of the reference signal is configured according to a non-uniform sequence pattern determined based on:
- a minimum hole sequence;
- a minimum redundancy sequence;
- a nested sequence; or
- any combination thereof.

3. The method of claim 2, wherein the plurality of subcarriers of the reference signal is power boosted.

4. The method of claim 2, wherein the non-uniform reference signal configuration is determined based on a capability report transmitted by the receiving device, and wherein the method further comprises:
- prior to receiving the non-uniform reference signal configuration, transmitting the capability report indicating:
  - a non-uniform reference signal pattern supported by the receiving device;
  - a preference of the non-uniform reference signal pattern;
  - a preferred power boosting factor; or
  - any combination thereof.

5. The method of claim 4, wherein the capability report is indicated in a LTE positioning protocol (LPP) message.

6. The method of claim 2, wherein the non-uniform reference signal configuration indicates:
- a parameter associated with the non-uniform sequence pattern;
- a power boosting factor of the plurality of subcarriers of the reference signal; or
- any combination thereof.

7. The method of claim 2, wherein the reference signal comprises a plurality of symbols, and wherein the plurality of subcarriers of the reference signal are spread across the plurality of symbols.

8. The method of claim 7, further comprising:
- multiplexing another reference signal configured in accordance with the non-uniform reference signal configuration.

9. The method of claim 1, further comprising:
- receiving a reflection of the reference signal reflected by a target; and
- positioning, sensing, or both the target based on the reflection of the reference signal.

10. The method of claim 1, further comprising:
- positioning, sensing, or both the receiving device based on the one or more TOA measurements.

11. The method of claim 1, wherein a frequency spacing between different pairs of neighboring and non-neighboring subcarriers of the reference signal comprises a set of contiguous integer numbers.

12. A method of positioning, sensing, or both performed by a server, the method comprising:
- determining a non-uniform reference signal configuration for a reference signal of positioning, sensing, or both, wherein the reference signal comprises a plurality of subcarriers, and wherein according to the non-uniform reference signal configuration, the reference signal is configured such that a frequency spacing between different pairs of neighboring subcarriers of the reference signal comprises a plurality of different values; and
- transmitting the non-uniform reference signal configuration for determining one or more time of arrival (TOA) measurements based on the reference signal.

13. The method of claim 12, wherein the plurality of subcarriers of the reference signal is configured according to a non-uniform sequence pattern determined based on:
- a minimum hole sequence;
- a minimum redundancy sequence;
- a nested sequence; or
- any combination thereof.

14. The method of claim 13, wherein the plurality of subcarriers of the reference signal is power boosted.

15. The method of claim 13, wherein the method further comprises:
- prior to determining the non-uniform reference signal configuration, receiving from a receiving device, a capability report indicating:
  - a non-uniform reference signal pattern supported by the receiving device;
  - a preference of the non-uniform reference signal pattern;
  - a preferred power boosting factor; or
  - any combination thereof, and
- wherein the non-uniform reference signal configuration is determined based on the capability report.

16. The method of claim 15, wherein the capability report is indicated in a LTE positioning protocol (LPP) message.

17. The method of claim 13, wherein the non-uniform reference signal configuration indicates:
- a parameter associated with the non-uniform sequence pattern;
- a power boosting factor of the plurality of subcarriers of the reference signal; or
- any combination thereof.

18. The method of claim 13, wherein the reference signal comprises a plurality of symbols, and wherein the plurality of subcarriers of the reference signal are spread across the plurality of symbols.

19. The method of claim 12, wherein a frequency spacing between different pairs of neighboring and non-neighboring subcarriers of the reference signal comprises a set of contiguous integer numbers.

20. The method of claim 12, further comprising performing positioning, sensing, or both using the one or more TOA measurements.

21. A device for positioning, sensing, or both performed, the device comprising:

a transceiver;

a memory; and one or more processors communicatively coupled with the transceiver and the memory, wherein the one or more processors are configured to:

receive a non-uniform reference signal configuration for positioning, sensing, or both;

receive a reference signal configured in accordance with the non-uniform reference signal configuration, wherein the reference signal comprises a plurality of subcarriers, and wherein a frequency spacing between different pairs of neighboring subcarriers of the reference signal comprises a plurality of different values; and determine one or more time of arrival (TOA) measurements used for positioning, sensing, or both based on the received reference signal.

22. The device of claim 21, wherein the plurality of subcarriers of the reference signal is configured according to a non-uniform sequence pattern determined based on:

a minimum hole sequence;

a minimum redundancy sequence;

a nested sequence; or any combination thereof.

23. The device of claim 22, wherein the plurality of subcarriers of the reference signal is power boosted.

24. The device of claim 22, wherein the non-uniform reference signal configuration is determined based on a capability report transmitted by the device, and wherein the one or more processors are further configured to:

prior to receiving the non-uniform reference signal configuration, transmit the capability report indicating:

a non-uniform reference signal pattern supported by the device;

a preference of the non-uniform reference signal pattern;

a preferred power boosting factor; or any combination thereof.

25. The device of claim 24, wherein the capability report is indicated in a LTE positioning protocol (LPP) message.

26. The device of claim 22, wherein the non-uniform reference signal configuration indicates:

a parameter associated with the non-uniform sequence pattern;

a power boosting factor of the plurality of subcarriers of the reference signal; or any combination thereof.

27. The device of claim 22, wherein the reference signal comprises a plurality of symbols, and wherein the plurality of subcarriers of the reference signal are spread across the plurality of symbols.

28. The device of claim 27, wherein the one or more processors are further configured to:

multiplex another reference signal configured in accordance with the non-uniform reference signal configuration.

29. The device of claim 21, wherein the one or more processors are further configured to:

receive a reflection of the reference signal reflected by a target; and position the target based on the reflection of the reference signal.

30. The device of claim 21, wherein the one or more processors are further configured to:

position the device based on the one or more TOA measurements.

31. A server for positioning, sensing, or both performed, the server comprising:

a transceiver;

a memory; and one or more processors communicatively coupled with the transceiver and the memory, wherein the one or more processors are configured to:

determine a non-uniform reference signal configuration for a reference signal of positioning, sensing, or both, wherein the reference signal comprises a plurality of subcarriers, and wherein according to the non-uniform reference signal configuration, the reference signal is configured such that a frequency spacing between different pairs of neighboring subcarriers of the reference signal comprises a plurality of different values; and transmit the non-uniform reference signal configuration for determining one or more time of arrival (TOA) measurements based on the reference signal.

32. The server of claim 31, wherein the one or more processors are further configured to:

perform positioning, sensing, or both using the one or more TOA measurements.

* * * * *